US008396440B2

(12) United States Patent
Canpolat et al.

(10) Patent No.: US 8,396,440 B2
(45) Date of Patent: Mar. 12, 2013

(54) SIGNAL RECEPTION METHOD AND APPARATUS FOR NON-STATIONARY CHANNELS

(75) Inventors: Bahadir Canpolat, Farnborough (GB); Ming Yan, San Diego, CA (US); Farrokh Abrishamkar, San Diego, CA (US); Divaydeep Sikri, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 12/820,958

(22) Filed: Jun. 22, 2010

(65) Prior Publication Data

US 2011/0312275 A1  Dec. 22, 2011

(51) Int. Cl.
*H04B 1/10* (2006.01)

(52) U.S. Cl. .............. 455/296; 455/63.1; 455/67.11; 455/67.13; 375/346; 375/348; 375/350; 375/230; 375/232

(58) Field of Classification Search ............ 455/63.1, 455/67.11, 67.13, 296; 375/147, 148, 346, 375/348–350, 229, 230, 232
See application file for complete search history.

(56) References Cited

U.S. PATENT DOCUMENTS

| 6,259,730 | B1 * | 7/2001 | Solondz ............... 375/232 |
| 6,615,030 | B1 * | 9/2003 | Saito et al. ............ 455/296 |
| 6,771,689 | B2 * | 8/2004 | Solondz ............... 375/144 |
| 6,834,197 | B2 * | 12/2004 | Nakahara et al. ........ 455/522 |
| 7,116,735 | B2 * | 10/2006 | Yamada et al. .......... 375/354 |
| 7,313,189 | B2 * | 12/2007 | Yoshida et al. .......... 375/260 |
| 7,693,210 | B2 * | 4/2010 | Margetts et al. ......... 375/150 |
| 7,706,430 | B2 * | 4/2010 | Guo et al. ............. 375/148 |
| 2005/0232174 | A1 | 10/2005 | Onggosanusi et al. |
| 2006/0109938 | A1 | 5/2006 | Challa et al. |
| 2007/0058709 | A1 | 3/2007 | Chen et al. |
| 2008/0232439 | A1 | 9/2008 | Chen |

FOREIGN PATENT DOCUMENTS

| EP | 1569399 A1 | 8/2005 |
| WO | WO2004010573 A1 | 1/2004 |
| WO | WO2011028978 | 3/2011 |

OTHER PUBLICATIONS

International Search Report and Written Opinion—PCT/US2011/041507—ISA/EPO—Dec. 6, 2011.

* cited by examiner

*Primary Examiner* — Tuan A Tran
(74) *Attorney, Agent, or Firm* — Kenneth Vu

(57) ABSTRACT

A signal reception method includes receiving a signal over a channel, producing a first equalized signal, a first interference suppression filter and a first estimate of the channel using a portion of a the received signal, dividing the received signal into a plurality of signal blocks, and for each one of the plurality of signal blocks, producing a second equalized signal using a portion of the first equalized signal by selecting from one of a linear estimator or a non-linear estimator and estimating symbols received in the one of the plurality of signal blocks based on the second equalized signal.

50 Claims, 17 Drawing Sheets

SIGNAL RECEPTION METHOD AND APPARATUS FOR NON-STATIONARY CHANNELS

BACKGROUND

Reference to Co-Pending Applications for Patent

The present application for patent is related to co-pending U.S. patent application Ser. No. 12/553,848, entitled "MULTI-STAGE INTERFERENCE SUPPRESSION," filed Sep. 3, 2009, assigned to the assignee hereof, and expressly incorporated by reference herein.

The present application for patent is related to co-pending U.S. patent application Ser. No. 12/553,855, entitled "SYMBOL ESTIMATION METHODS AND APPARATUSES," filed Sep. 3, 2009, assigned to the assignee hereof, and expressly incorporated by reference herein.

FIELD

The present invention relates to wireless communication and, in particular, relates to interference cancellation at a receiver.

BACKGROUND

In many communication systems utilizing GSM, GPRS, EDGE or the like, a receiver's ability to properly decode a received signal depends upon the receiver's ability to effectively suppress co-channel interference (CCI) and inter-symbol interference (ISI). The decoding task becomes even more challenging when channel characteristics vary with time, such as when a receiver is mobile. As wireless communications become ever more prevalent, however, increasing amounts of CCI and ISI can negatively affect a receiver's ability to suppress interference.

SUMMARY

In an aspect of the disclosure, a signal reception method may comprise one or more of the following: receiving a signal over a channel, producing a first equalized signal, a first interference suppression filter and a first estimate of the channel using a portion of the received signal, dividing the received signal into a plurality of signal blocks, and for each one of the plurality of signal blocks: producing a second equalized signal using a portion of the first equalized signal and one of a linear estimator or a non-linear estimator and estimating symbols received in the one of the plurality of signal blocks based on the second equalized signal.

In another aspect of the disclosure, a signal receiver comprises a processor and a memory. The processor may be configured to execute a set of instructions stored in the memory to perform one or more of the following operations: receive a signal over a channel, produce a first equalized signal, an interference suppression filter and a first estimate of the channel using a portion of the received signal, divide the received signal into a plurality of signal blocks, and for each one of the plurality of signal blocks: produce a second equalized signal using a portion of the first equalized signal and one of a linear estimator or a non-linear estimator and estimate symbols received the one of the plurality of signal blocks based on the second equalized signal.

In yet another aspect of the disclosure, a machine-readable medium is encoded with instructions for receiving a signal at a receiver, the instructions comprising code for one or more of the following: receiving a signal over a channel, producing a first equalized signal, a first interference suppression filter and a first estimate of the channel using a portion of the received signal, dividing the received signal into a plurality of signal blocks, and for each one of the plurality of signal blocks: producing a second equalized signal using a portion of the first equalized signal and one of a linear estimator or a non-linear estimator and estimating symbols received in the one of the plurality of signal blocks based on the second equalized signal.

In yet another aspect of the disclosure, a signal reception apparatus comprising: means for receiving a signal over a channel, means for producing a first equalized signal, an interference suppression filter and a first estimate of the channel using a portion of the received signal, means for dividing the received signal into a plurality of signal blocks, and for each one of the plurality of signal blocks: means for producing a second equalized signal using a portion of the first equalized signal and one of a linear estimator or a non-linear estimator and means for estimating symbols received in the one of the plurality of signal blocks based on the second equalized signal.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
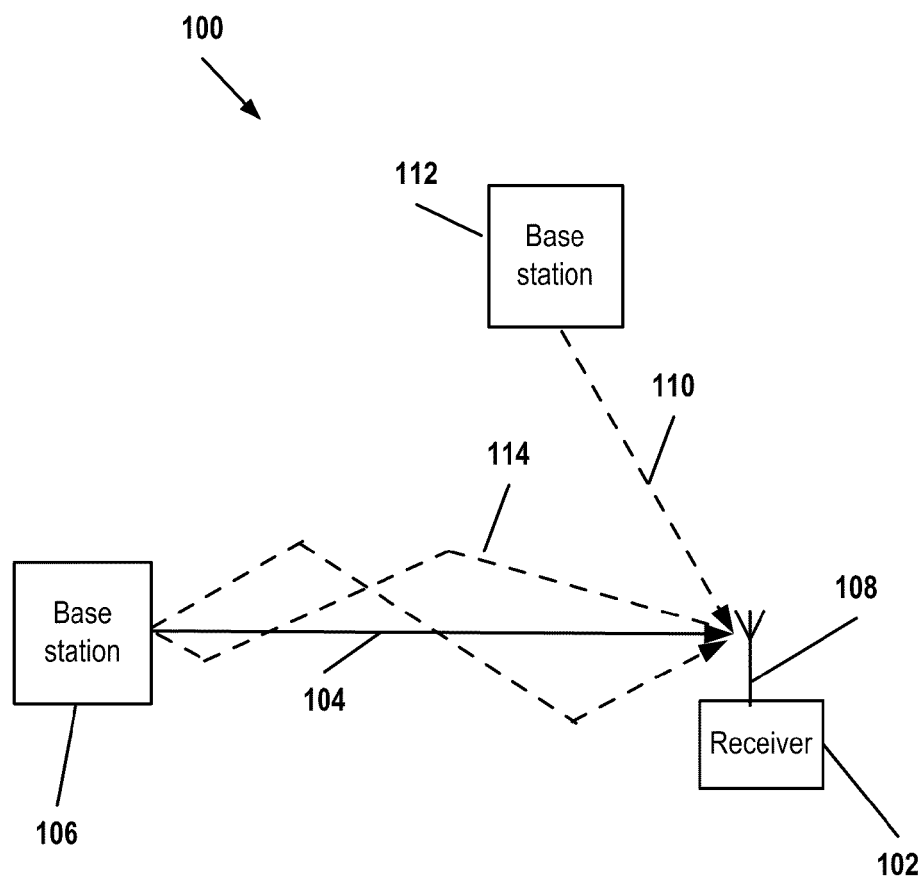
FIG. 1 illustrates an exemplary communication system in accordance with certain configurations of the present disclosure.

Receivers operating in accordance with certain wireless standards, such as GERAN, often receive signals over a channel that may be characterized as a fading channel. Operation of a receiver often involves receiving a signal, extracting symbols from the received signal and demodulating the symbols to produce data bits. To help produce the data bits accurately, a receiver may also suppress (or remove) signal distortions caused by the communication channel, noise, interference from unwanted transmitters, and so on. Receivers are often designed by making assumptions about communication channels (e.g., assuming that a communication channel has a finite impulse response of a certain duration) and noise signals (e.g., assuming that noise has a white spectrum). Based on the assumptions made, a practitioner of the art may configure a receiver to suppress the signal distortions by performing channel equalization using, for example, maximum likelihood (ML) detection, decision feedback equalization (DFE), minimum least squares estimate (MLSE) and other well-known algorithms.

While algorithms such as the MLSE may provide optimal results in many applications, the MLSE tends to be computationally expensive, making it an unattractive option for implementation at a resource-limited wireless device. Furthermore, computational complexity of the MLSE increases non-linearly with increasing constellation density of the received signals. Therefore, in communications networks that use higher order modulation schemes (e.g., 8 PSK), a channel equalization and/or an interference suppression (or interference cancellation) technique that is computationally less expensive than the MLSE may be desirable.

Channel equalization techniques using the MLSE are generally called "non-linear" channel equalization techniques in the art. Other techniques such as channel equalization using a linear combiner are generally called "linear" channel equalization techniques. Broadly speaking, the MLSE algorithm works better than other techniques when some information is available about a channel and/or received signal amplitude distortion is severe. In certain aspects, configurations of the present disclosure provide methods and systems wherein channel equalization and interference suppression may be performed using either a non-linear technique such as the MLSE or a linear technique such as a linear combiner, based on certain operational conditions of the receiver. These operational conditions may include, for example, constellation density of the received signal and severity of distortion in the received signal. In one aspect, such architecture may be advantageous for a receiver expected to receive signals with different modulation schemes in the same network. For example, the GERAN Evolution standard uses modulation schemes including GMSK, QPSK, 8 PSK, 16-QAM and 32-QAM.

The previously referenced co-pending patent application (Ser. No. 12/553,848) provides signal reception techniques including producing a first equalized signal and a first estimate of a channel by operating on a first portion of a received portion, producing a second equalized signal using the first equalized signal and one of a linear estimator and a non-linear estimator, estimating a first estimate of symbols in the received signal and a second estimate of the channel from a second portion of the received signal and generating a second estimate of symbols in the received signal based on the second estimate of the channel.

In a non-stationary environment, when the characteristics of the channel between a transmitter and a receiver are changing rapidly relative to the symbol rate, estimating symbols of a later received portion of a burst using a channel estimate obtained from an earlier received portion of the burst may produce unsatisfactory results. The problem may further be worsened due to Doppler effect or component inaccuracies, resulting in a mismatch between the carrier frequency of the received signal and an estimate of the carrier frequency calculated at the receiver. For example, in a typical GERAN receiver, carrier mismatch may be of the order of 0.2 to 0.3 parts per million, resulting in a 150 to 200 Hertz mismatch in a GERAN network.

Accordingly, in certain aspects, the subject technology of the present disclosure relates to methods and systems for performing improved signal reception under time-varying channel conditions. In certain aspects, an iterative process may be used to recover data from received symbols. In the first iteration of the iterative process, a "known" portion of a received signal burst (e.g., a preamble or a midamble) may be used to estimate and remove interference from the received signal and calculate an estimate of the channel. The results of the first iteration may then be iteratively improved by increasing the size of received data symbols used to perform interference cancellation/channel estimation in each successive iteration. The previously referenced co-pending patent application (Ser. No. 12/553,848), incorporated by reference herein, describes an iterative data recovery process, called multi-stage interference suppression (MSIS) in this disclosure. In certain configurations, the MSIS may be implemented by dividing a received signal into multiple sub-blocks and performing separate interference cancellation/channel estimation on each sub-block. In certain aspects, because each channel estimate is calculated over a shorter duration portion of a received burst, more accurate data reception (e.g., better bit error rate) may be possible under non-stationary channel conditions. In certain aspects, the multi-iteration signal reception method of the present disclosure may reduce the computational complexity by re-using a portion of results of calculations performed in an initial (first) iteration in the subsequent iterations (e.g., an estimate of interference). This and other features of the subject technology are further described below.

The following abbreviations are used throughout the disclosure.

CCI=co-channel interference
EDGE=enhanced data rate for GSM evolution
eSAIC=enhanced single antenna interference cancellation
FER=frame error rate
GERAN=GSM EDGE radio access network
GP=guard period
GSM=Global Standard for Mobile communication (Groupe Mobil Special)
IC=interference cancellation/canceller
ISI=inter-symbol interference
LLR=log-likelihood ratio
MDD=minimum distance detector
MEQ=multiple stream equalizer
MIMO=Multiple input multiple output
ML=maximum likelihood
MLSE=maximum likelihood sequence estimator
MMSE=minimum mean squared error
MSIC=multiple stream inter-symbol interference cancellation
MSIS=multi-state interference suppressor
PHIC=parallel hierarchical interference cancellation
PSK=phase shift keying
RLS=recursive least squares
RSSE=Reduced state sequence estimation
SER=symbol error rate
SNR=signal to noise ratio
TDMA=time domain multiple access FIG. 1 illustrates a communication system 100 in accordance with one aspect of the subject technology. The communication system 100 may, for example, be a wireless communication system based on the GSM standard. A receiver 102 may receive a signal 104 transmitted by a base station 106 at an antenna 108 coupled to the receiver 102. However, as illustrated, the signal 104 may suffer from impediments such as co-channel interference (CCI), including interference from a transmission 110 from another base station 112, and inter-symbol interference (ISI) comprising one or more reflections 114 of the signal 104. Accordingly, in certain aspects, the receiver 102 may process the signal 104 to suppress effects of CCI and ISI and recover the data transmitted by the base station 106 by estimating received symbols. While FIG. 1 depicts a single antenna 108 for the sake of clarity, it is contemplated that configurations of the present disclosure also include MIMO transmission systems and the receiver 102 may have multiple receive antennas to receive the signal 104.

Figure 2A:
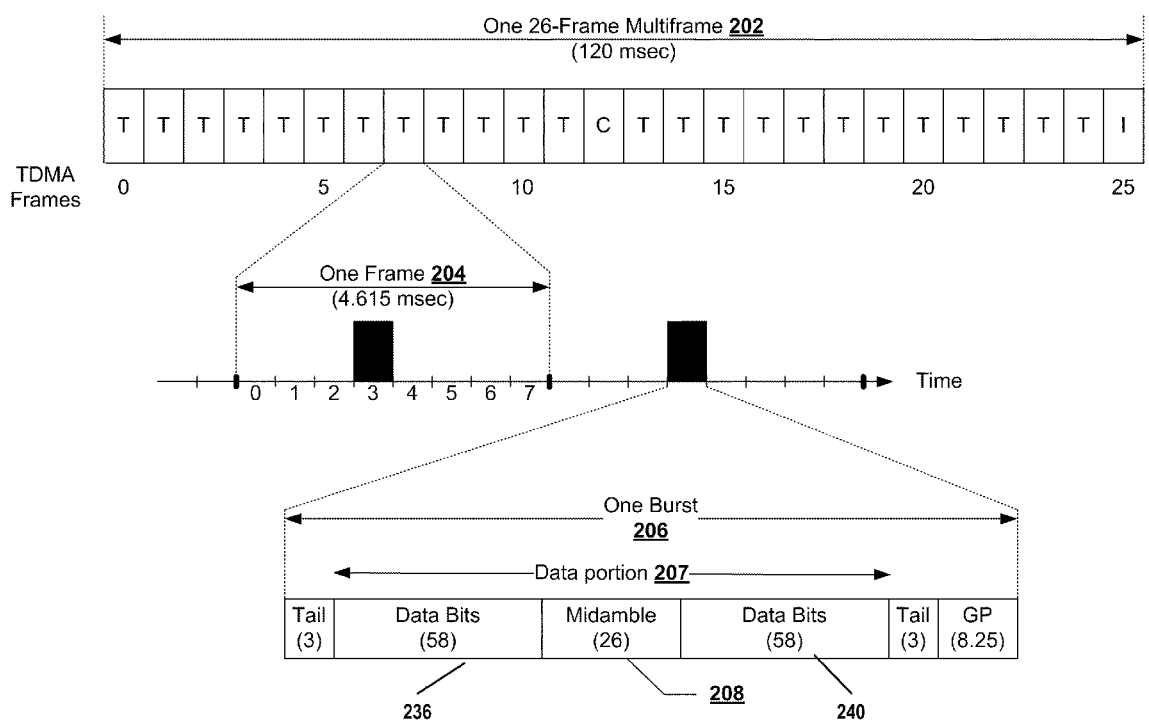
FIG. 2A is illustrates exemplary frame and burst formats in a GSM transmission, in accordance with certain configurations of the present disclosure.

FIG. 2A shows exemplary frame and burst formats in GSM. The timeline for downlink transmission is divided into multiframes. For traffic channels used to send user-specific data, each multiframe, such as exemplary multiframe 202, includes 26 TDMA frames, which are labeled as TDMA frames 0 through 25. The traffic channels are sent in TDMA frames 0 through 11 and TDMA frames 13 through 24 of each multiframe, as identified by the letter "T" in FIG. 2A. A control channel, identified by the letter "C," is sent in TDMA frame 12. No data is sent in the idle TDMA frame 25 (identified by the letter "I"), which is used by the wireless devices to make measurements for neighbor base stations.

Each TDMA frame, such as exemplary TDMA frame 204, is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Each burst, such as exemplary burst 206, includes two tail fields, two data fields 236, 240, a training sequence field (or midamble portion) 208, and a guard period (GP). The number of bits in each field is shown inside the parentheses. GSM defines eight different training sequences that may be sent in the training sequence field. Each training sequence, such as midamble portion 208, contains 26 bits and is defined such that the first five bits are repeated and the second five bits are also repeated. Each training sequence is also defined such that the correlation of that sequence with a 16-bit truncated version of that sequence is equal to (a) sixteen for a time shift of zero, (b) zero for time shifts of ±1, ±2, ±3, ±4, and ±5, and (3) a zero or non-zero value for all other time shifts. A data portion 207 of the burst 206 includes the data fields 236, 240 and the midamble portion 208.

Figure 2B:
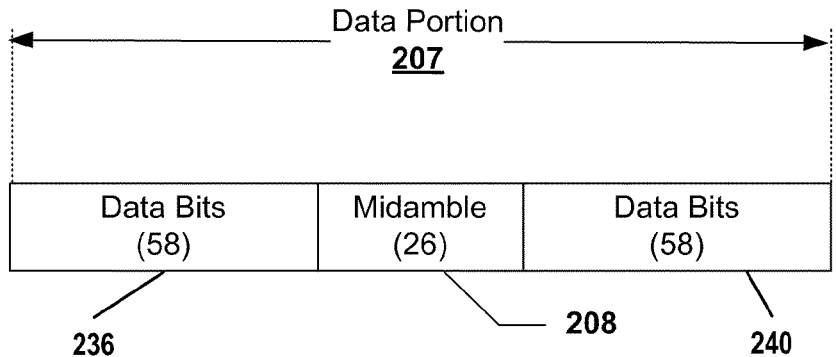
FIG. 2B is illustrates an exemplary burst format in a GSM transmission, in accordance with certain configurations of the present disclosure.

Referring now to FIG. 2B, the data portion 207 of a single burst 206 of a received signal, such as a GSM signal depicted in FIG. 2A, is displayed. In certain configurations of the present application, symbols from the entire data portion 207 may be used to recover received data by performing interference cancellation and channel estimation utilizing the received symbols from the data portion 207, as will be described in greater detail below. The data portion 207 comprises the data field 236, comprising 58 data bits, the data field 240, comprising 58 data bits, and the midamble portion 208, comprising 26 bits.

Figure 2C:
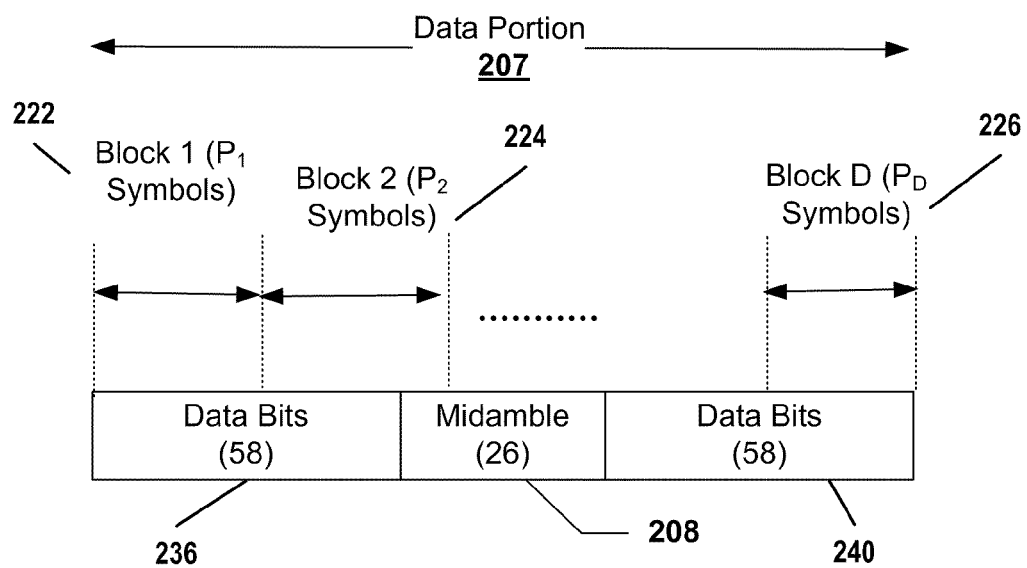
FIG. 2C is illustrates an exemplary division of a burst signal, in a GSM transmission, in accordance with certain configurations of the present disclosure.

Referring now to FIG. 2C, in certain configurations of the present application, the received symbols in the data portion 207 may be divided into multiple blocks of symbols: a block 222 comprising P1 symbols, a block 224 comprising P2 symbols up to a block 226 comprising PD symbols. Each number P1 through PD and D is an integer. In certain configurations of the present application, data from the received data portion 207 may be recovered by performing interference cancellation and channel estimation on each block of symbols 222, 224, 226 separately, using results of a first iteration in subsequent iterations, as is described in greater detail below.

Figure 2D:
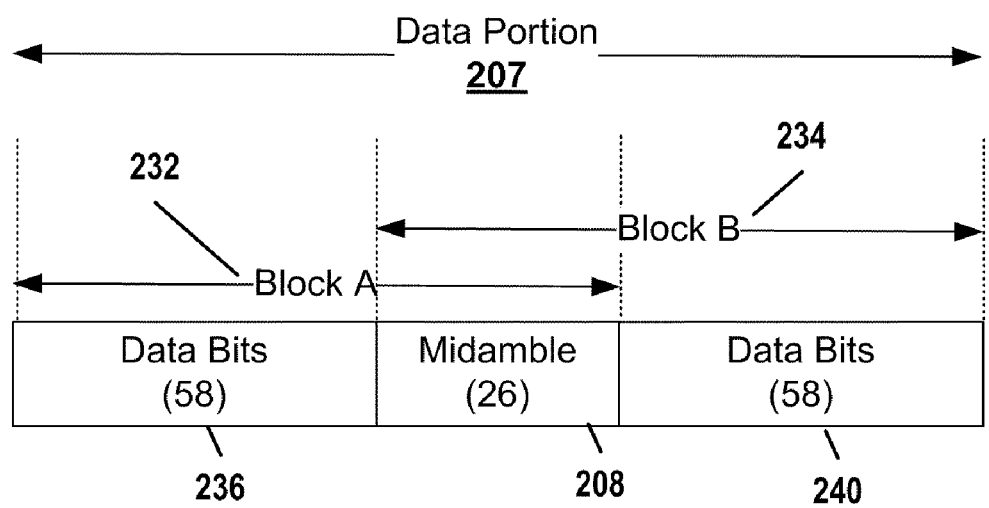
FIG. 2D is illustrates an exemplary division of a burst signal, in a GSM transmission, in accordance with certain configurations of the present disclosure.

Referring now to FIG. 2D, in certain configurations, the received symbols in the data portion 207 may be divided into a block of symbols 232 and a block of symbols 234. In the depicted division of symbols in blocks 232 and 234, the midamble portion 208 is shared between the two blocks 232 and 234. In certain configurations of the present application, received data may be recovered by performing interference cancellation and channel estimation on blocks 232, 234 and using certain results from the calculations performed in a first iteration in subsequent iterations, as is described in greater detail below.

Figure 3A:
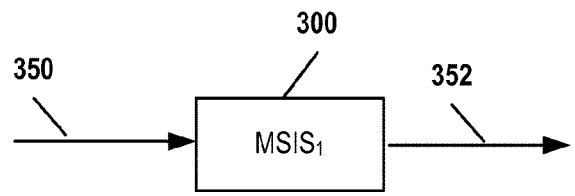
FIG. 3A is a block diagram of a portion of a receiver, in accordance with certain configurations of the present disclosure.

FIG. 3A is a block diagram of a portion of a receiver 102 in accordance with certain configurations of the present application. As depicted in FIG. 3A, in certain configurations of the present application, a multi-stage interference suppresser (MSIS) section 300 may be provided to produce received data 352 by processing the data portion 207, such as depicted in FIG. 2B, of the received signal 350. Signal processing details of the MSIS section 300 are described in greater detail below.

The configuration depicted in FIG. 3A is termed the "non-adaptive" MSIS in this disclosure.

Figure 3B:
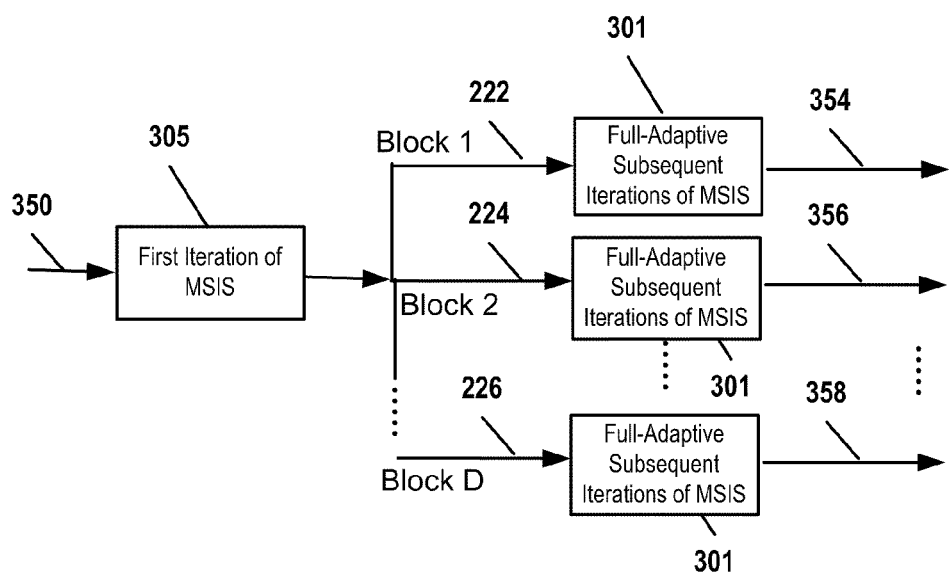
FIG. 3B is a block diagram of a portion of a receiver, in accordance with certain configurations of the present disclosure.

FIG. 3B is a block diagram of a portion of a receiver 102 in accordance with certain other configurations of the present application. In the depicted configuration of FIG. 3B, section 305 may represent the operation of the first iteration of MSIS 300 on the received signal 350. The output of section 305 may be partitioned into symbol blocks 222, 224 and 226, as depicted in FIG. 2C, (or blocks 232, 234 of FIG. 2D) and may each be input to "full-adaptive" subsequent iterations of MSIS sections 301, producing received data outputs 354, 356 and 358 respectively. The "full adaptive" subsequent iterations of MSIS 300 are further detail below.

Figure 3C:
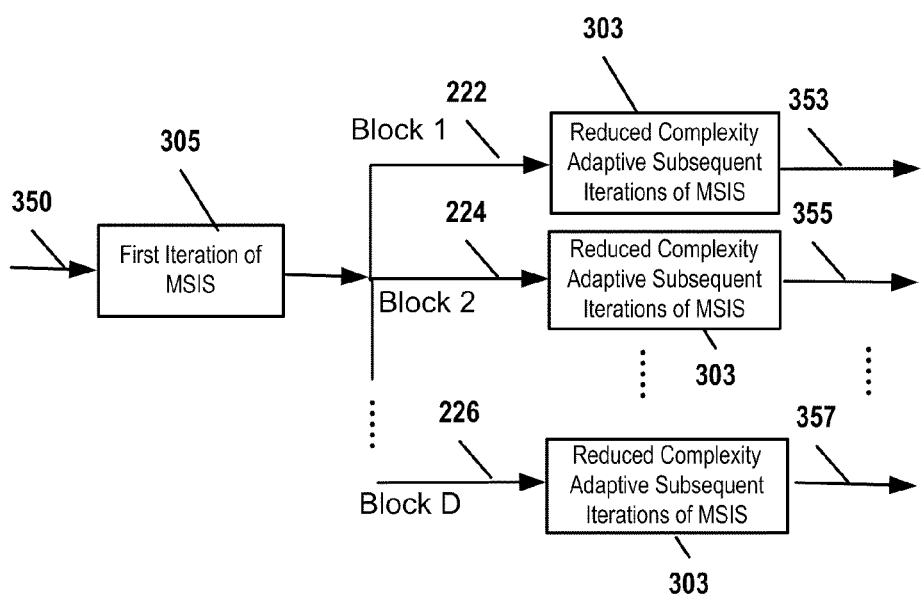
FIG. 3C is a block diagram of a portion of a receiver, in accordance with certain configurations of the present disclosure.

FIG. 3C is a block diagram of a portion of a receiver 102 in accordance with yet other configurations of the present application. In the depicted configuration of FIG. 3B, section 305 may represent the operation of the first iteration of MSIS 300 on the received signal 350. The output of section 305 may be partitioned into symbol blocks 222, 224 and 226, as depicted in FIG. 2C, (or blocks 232, 234 of FIG. 2D) and may each be input to "reduced-complexity adaptive" subsequent iterations of MSIS sections 303, producing received data outputs 353, 355 and 357 respectively. The "reduced-complexity adaptive" subsequent iterations of MSIS 300 are further detail below.

Figure 3D:
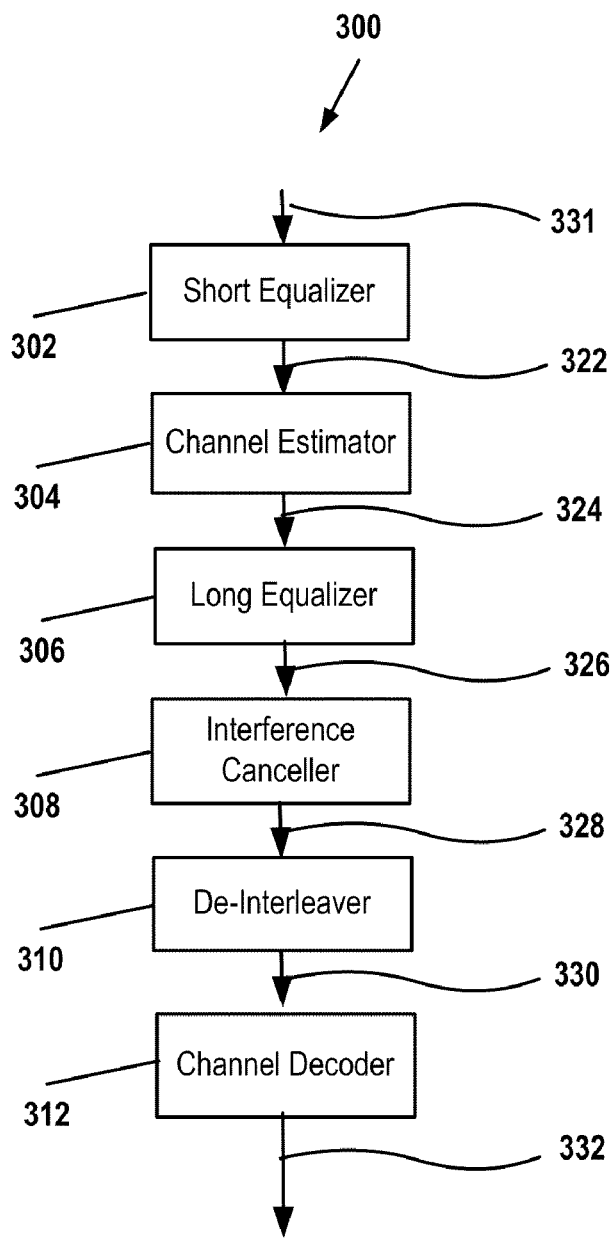
FIG. 3D is a block diagram of a portion of a receiver, in accordance with certain configurations of the present disclosure.

FIG. 3D is a block diagram of a multi-stage interference suppresser (MSIS) 300, in accordance with certain aspects of the present disclosure. The MSIS 300 may comprise a short equalizer section 302, a channel estimator section 304, a long equalizer section 306, an interference canceller section 308, a de-interleaver section 310 and a channel decoder section 312.

The short equalizer section 302 may be configured to generate a first equalized signal 322 (e.g., a first set of equalized symbols) by canceling CCI and ISI from a first portion of the input signal 331 (e.g., the midamble portion 208 or a preamble). The short equalizer section 302 also may generate a first estimate of the channel (e.g., impulse response coefficients) on which the received burst of symbols was received. The short equalizer section 302 may use, for example, a blind channel estimation algorithm to obtain the first estimate of the channel and may calculate a first set of equalized symbols. The short equalizer section 302 may initially operate upon an input signal corresponding to a short input sequence comprising a known signal (e.g., the midamble portion 208) and may iteratively process additional received signal samples, as further described below.

The channel estimator section 304 may be configured to use the first estimate of the channel and the first equalized signal (input 322) to further estimate the channel and further suppress ISI from the first set of equalized symbols and output a second equalized signal (output 324).

A long equalizer section 306 may use the second equalized signal 324 to further equalize the channel and suppress ISI and may produce a first estimate of symbols in the received set of symbols (output 326). The long equalizer section 306 may also produce a second estimate of the channel using the second equalized signal (also included in output 326).

An interference canceller section 308 may use the second estimate of the channel and the first estimate of symbols (collectively output 326) to refine the results to improve symbol decisions. The interference canceller section 308 may produce hard symbol decisions and log-likelihood values associated with the symbol decisions (together shown as output 328). The symbol values from the output 328 may be used by further receiver sections such as a de-interleaver 310 to generate data samples 330, which may further be decoded by a channel decoder 312 to produce demodulated data 332.

Figure 4:
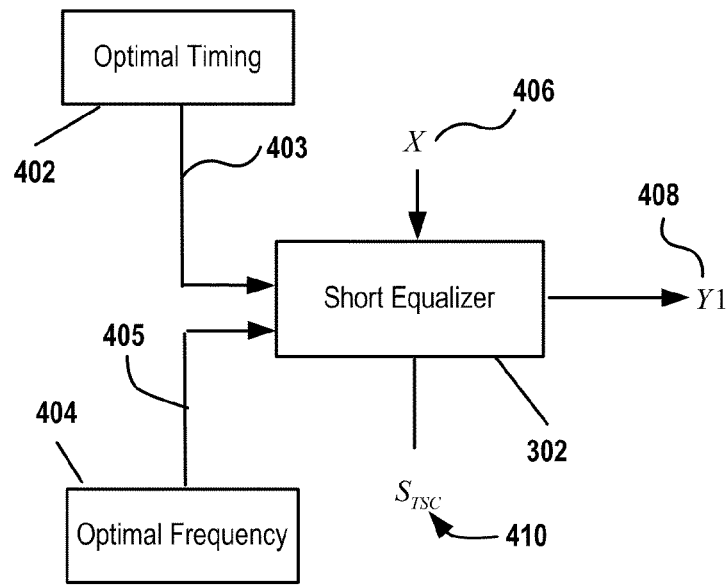
FIG. 4 is a block diagram of a short equalizer section, in accordance with certain configurations of the present disclosure.

FIG. 4 is a block diagram illustrating the operation of a short equalizer section 302, in accordance with certain configurations of the present disclosure. As depicted in FIG. 4, an optimal timing section 402 may provide timing information 403 to the short equalizer section 302. Furthermore, an optimal frequency section 404 may provide an estimate 405 of a carrier in the received signal to the short equalizer section 302. In certain configurations, the optimal frequency section 404 may compute an optimal estimate 405 by evaluating an SNR value, as further described in detail below. The short equalizer section 302 may use the optimal timing information 403 to minimize the estimation error incurred during channel equalization calculations. For example, the timing information 403 may also be useful in deciding the start time and the duration of a time window comprising the first portion of the received signal (e.g., the midamble portion 208). The short equalizer section 302 may use the frequency estimate 405 for recovering a carrier in the received signal. An optimal frequency estimate 405 may help improve performance of channel equalization by minimizing the estimation error. The short equalizer section 302 may thus produce a first equalized signal output Y1 408 (substantially identical to output 322 of FIG. 3D) from a set of input samples X 406, received from an earlier receiver section such as an analog-to-digital converter (not shown in FIG. 4) and a set of symbols of known values $S_{TSC}$ 410 (e.g., a preamble or the midamble portion 208).

Still referring to FIG. 4, in certain configurations, the optimal timing and the optimal frequency calculations may be performed sequentially. For example, first, an optimal timing estimate 403 may be obtained by minimizing a target function (e.g., minimizing least squares error), by holding the frequency offset to a constant value. Next, frequency estimate 405 may be improved by holding the optimal timing estimate unchanged and calculating another target function (e.g., SNR) by changing the frequency offset. This process may be iteratively repeated until no further improvements are achieved or until expiration of a time allocated for the calculation. For example, the SNR calculations may be performed by changing the frequency offset by one or more of {−200, −100, −50, 0, +50, +100, +200} Hz. One example error function for finding optimal timing is to minimize estimation error of a known set of symbols in the received signal. For example, in a GSM network, when the short equalizer 302 operates upon midamble portion 208 of the received signal, a midamble estimation error may be used as the error criterion for minimization during the optimal timing estimation. In certain configurations, maximizing the SNR may be used as the error criterion for finding optimal frequency estimates 405.

The above-described optimal timing and optimal frequency recovery techniques are merely exemplary and several other optimization techniques well known in the art are possible. For example, U.S. patent application Ser. No. 12/464,311, incorporated herein by reference in its entirety, discloses various methods of timing and carrier recovery.

Figure 5:
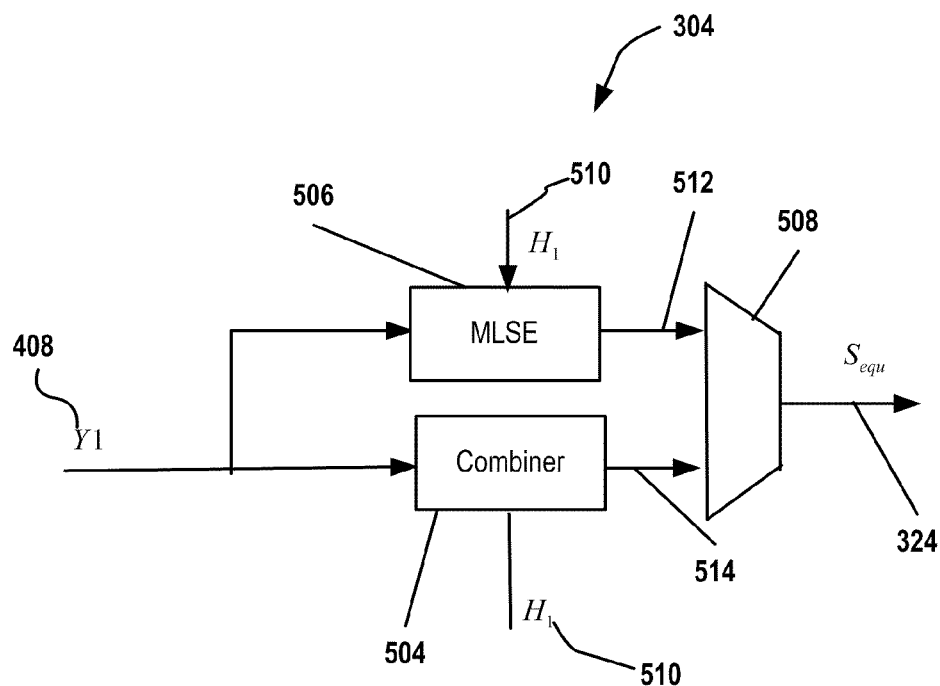
FIG. 5 is a block diagram of a channel estimator section, in accordance with certain configurations of the present disclosure.

FIG. 5 is a block diagram of the channel estimator section 304, in accordance with certain configurations of the present disclosure. The channel estimator section 304 may receive an estimate of symbols Y1 408 from a previous signal processing section (e.g. the short equalizer section 302). The channel estimator section 304 may also receive an estimate $H_1$ 510 of the channel (e.g., from the short equalizer section 302). In certain configurations, the channel estimator section 304 may be configured to use the output of one of either an MLSE channel 506 (output 512) or a linear combiner (briefly called a combiner) 504 (output 514) to output equalized symbols. The multiplexer 508 may select either all the equalized symbols from the output 512 or all the equalized symbols from the output 514 to produce the equalized symbols $S_{equ}$ at the output 324. In certain configurations, only one of the MLSE section 506 and the combiner section 504 may be operated on a given received signal. In certain other configurations, both the MLSE sections 506 and the combiner section 504 may be operated simultaneously, and an appropriate output may be selected by the multiplexer 508 to convey to the output 324.

The choice of operation of the MLSE section 506 and/or the combiner section 504 may be made in a variety of ways. For example, in certain configurations, the choice may be fixed a priori, based on the modulation of signals received during operation of the receiver 102. For example, in certain configurations, the MLSE section 506 may be used only when the input signal comprises GMSK modulation and the input symbols have two possible values (e.g., 1-bit per symbol encoding), and the combiner section 504 may be used when other (higher) constellation densities are received. In certain other configurations, the choice between sections 504 and 506 may be made at run time. When calculations performed during channel estimation (e.g., at section) show that the received signal suffers from severe amplitude distortion, then MLSE section 506 may be used, otherwise combiner section 504 may be used. Such a run-time selection may advantageously allow the receiver 102 to allocate computational resources to receive signals on an "as needed" basis, freeing up the computational resources for other tasks at the receiver 102.

The output 324 may be used by the long equalizer section 306. In certain configurations, the operational principles of the long equalizer section 306 may be similar to the operational principles of the short equalizer section 302 discussed previously. The long equalizer section 306 may compute a set of channel equalized output samples 326 using the equalized symbol set $S_{equ}$ 324 as the training sequence and the input samples X 406. In certain configurations, the long equalizer section 306 may operate upon a training sequence having a larger number of samples compared to the short equalizer section 302. For example, in a GSM network, the long equalizer section 306 may be operated on 142 samples, comprising 116 data samples and 26 midamble samples.

The interference canceller section 308 shown in FIG. 3D may produce an output 328 comprising symbol decisions and log-likelihood values for the symbol decisions. Previously referenced co-pending U.S. patent application Ser. No. 12/553,855, incorporated herein by reference in its entirety, discloses certain configurations of operation of the interference canceller section 308 consistent with certain configurations of the present disclosure.

To describe certain configurations comprising various sections depicted in FIG. 3D in mathematical terms, the received signal samples and interference (noise) may be written as below. For example, given a set of spatial and temporal samples at a time k:

$$x_k = \begin{bmatrix} x_k(1) \\ x_k(2) \\ \vdots \\ x_k(M) \end{bmatrix}, s_k = \begin{bmatrix} s_k \\ s_{k-1} \\ \vdots \\ s_{k-v} \end{bmatrix} \quad (1a)$$

where $s_k$ is the midamble/quasi-midamble signal at time k, $\underline{s}_k$ is a $(v+1) \times 1$ midamble/quasi-midamble vector, and $x_k$ is a $M \times 1$ received midamble/quasi-midamble vector, a set of spatial temporal samples can be defined as $$X_k = \begin{bmatrix} x_k \\ x_{k-1} \\ \vdots \\ x_{k-L} \end{bmatrix}, \quad (1b)$$

where $X_k$ is a $M \times (L+1) \times 1$ vector of spatial temporal samples with a spatial length of M and a temporal length L+1, where M is the number of MIMO receive antennas on the receiver 102, L is the temporal stacking factor used to temporally stack received samples, v is channel memory and P is the length of the midamble or quasi-midamble that represents the length of the received signal being used in a given iteration, and wherein each of M, L, v and P is a positive integer. The received signal samples can then be written as a function of convolution of the received symbols through a linear filter and an additive noise term as:

$$x_1(k) = h_1^T s(k) + g_1^T z(k) + n_1, x_2(k) = h_2^T s(k) + g_2^T z(k) + n_2, \quad (1c)$$

The task performed in the linear combiner 504 of the channel estimator section 304 can then be expressed as follows: estimate $\underline{s}_k$ given $x_k$. U.S. application Ser. No. 12/038,724, incorporated herein by reference in its entirety, discloses various techniques that may be utilized to perform such estimation.

In certain configurations, more samples may be used for calculating results of channel equalization using the MMSE, so that a full column rank for matrix inversion may be obtained. In such configurations, the input signal samples may be spatially and temporally stacked to obtain the following matrix:

$$\underline{X}_k = [\underline{x}^T(k) \, \underline{x}^T(k-1) \ldots \underline{x}^T(k-L)]^T \quad (2)$$

Accordingly, a spatial/temporal structured matrix can be constructed, such that $$[X] = [\underline{X}_k, \underline{X}_{k+1}, \ldots, \underline{X}_{k+P-v}], \quad (3)$$

where [X] is a M (L+1)×(P-v) matrix. As an example, in a GSM network, P=26. Similar to the data matrix [X], temporal/spatial stacking for the symbols in the received signal gives the symbol matrix in equation (4).

$$[S] = [\underline{S}_k, \underline{S}_{k+1}, \ldots \underline{S}_{k+P-v}], (v+1) \times (P-v) \quad (4)$$

As is well-known in the art, an interference suppression filter that can suppress interference can be expresses as:

$$W = [S][X]^T \{[X][X]^T\}^{-1}, (v+1) \times M(L+1) \quad (5)$$

Using the expression in equation (5) above, the output Y1 408 of the short equalizer section 302 shown in FIGS. 3D and 4 can be written as:

$$Y1 = [W][X], (v+1) \times (P-v) \quad (6)$$

In certain configurations, the number of midamble samples used to estimate output Y1 408 may be increased from one iteration to the next, during the iterative process of channel equalization. For example, in certain configurations when the received signal is a GSM signal, the channel equalization calculations can start with P=26, corresponding to the number of samples of midamble portion 208. In each subsequent iteration, more and more data bits can be included as the channel estimate improves. For example, in certain configurations, one additional sample from each side of the midamble portion 208 may be added to the symbol matrix [S] shown in equation (4).

Certain aspects of the channel estimator section 304 can be explained in mathematical terms as follows. The output of the short equalizer section 302 can be expressed in terms of an equivalent channel:

$$Y1 = [H]_1 [S], \quad (7)$$

In equation (7), $[H]_1$ may be the equivalent channel estimate, with dimension (v+1, v+1) and [S] is the (v+1, P−v) reference symbol matrix shown in equation (4). Generally speaking, output Y1 408 of the short equalizer 302 may be a vector of streams of symbol values that has cancelled a significant amount of CCI, but a relatively smaller amount of ISI from the input signal X 406. The least-squares (LS) estimate of $[H]_1$ is as shown in equation (8) below. The channel estimator section 304 may calculate the LS estimate as:

$$[\hat{H}]_1 = [Y1][S]^H [SS^H]^{-1}. \quad (8)$$

As previously discussed, in certain configurations, the channel estimator section 304 may calculate the LS estimate $[\hat{H}]_1$ using either a non-linear or a linear algorithm, decided either at run time or a priori. Certain aspects of the linear algorithm, implemented at the combiner 504, can be explained in mathematical terms as follows.

The output Y1 408 of the short equalizer 302, as described above, can also be represented as a matrix shown in equation (9) of estimated symbols to further explain the working of the combiner 504.

$$[Y1] = \begin{bmatrix} \hat{s}_v^0 & \hat{s}_{v+1}^0 & \hat{s}_{v+1}^0 & \hat{s}_{v+1}^0 & \cdots & \hat{s}_{N-1}^0 \\ \hat{s}_{v-1}^1 & \hat{s}_v^1 & \hat{s}_{v+1}^1 & \hat{s}_{v+2}^1 & \cdots & \hat{s}_{N-2}^1 \\ \vdots & \vdots & \vdots & \vdots & \vdots & \vdots \\ \hat{s}_0^v & \hat{s}_1^v & \cdots & \hat{s}_v^v & \cdots & \hat{s}_{N-1-v}^v \end{bmatrix} \quad (9)$$

It can be seen that the [Y1] matrix in equation (9) has a Toeplitz-like appearance, with an estimated symbol appearing in a row below, shifted one column to the right. For example, when the short equalizer 302 has equalized the channel to a large extent, the symbol $\hat{s}_v^0$ in the first row and first column may have approximately the same value as the symbol $\hat{s}_v^1$ in the second row, second column, and so on. In certain configurations, when using the short equalizer 302 for equalizing GSM signals, the matrix [Y1] may have dimension 5 rows×138 columns, corresponding to a 4-tap filter for channel equalization and using received signal samples comprising 116 data bits and 26 midamble symbols.

In the combiner 504 of FIG. 5, the symbol estimates may be calculated as a weighted combination of the diagonal terms of [Y1] (terms that will be substantially identical to each other, due to the Toeplitz-structure, as explained above). For example, a linear combination of a symbol estimate can be expressed as:

$$\hat{s}_c(k) = \frac{1}{v+1} \sum_{i=0}^{v} \hat{s}_k^i \alpha_i, \quad v \le k \le N-1-v. \quad (10a)$$

In equation (10a) above, N may represent the maximum data length of the signal. For example, in a GSM network, N=138 (corresponding to 116 data samples plus 26 midamble samples minus 4, channel memory filter delay). The weighting factors may be given as $$\alpha_i = \sum_{j=0}^{v} |\hat{H}_{i,j}|^2, \quad 0 \le i \le v \quad (10b)$$

It can be seen from equations (10a) and (10b) that symbol estimates may be expressed as a linear combination of (v+1) previously estimated symbols. For example, in a GSM network, the value v may be chosen to be equal to 5. In such a network, a linear combination of 6 symbols may be used to obtain a symbol estimate expressed in equation (10). The weighting factors given in equation (10b) may estimate the energy in the impulse response of the estimated filter for each channel. Therefore, the weighting factors may weigh the effect of each symbol in equation (10a) in proportion of the energy in the corresponding channel.

The output estimates obtained by solving equation (10a) may then be hard-sliced to obtain hard estimates of symbols (first estimate of symbols), and may be provided as output 328 to the interference canceller 308.

The interference canceller section 308 may be configured to operate on the first estimate of symbols from output 326 to generate a second estimate of symbols in the received signal based on, at least in part, a second estimate of the channel.

Figure 6:
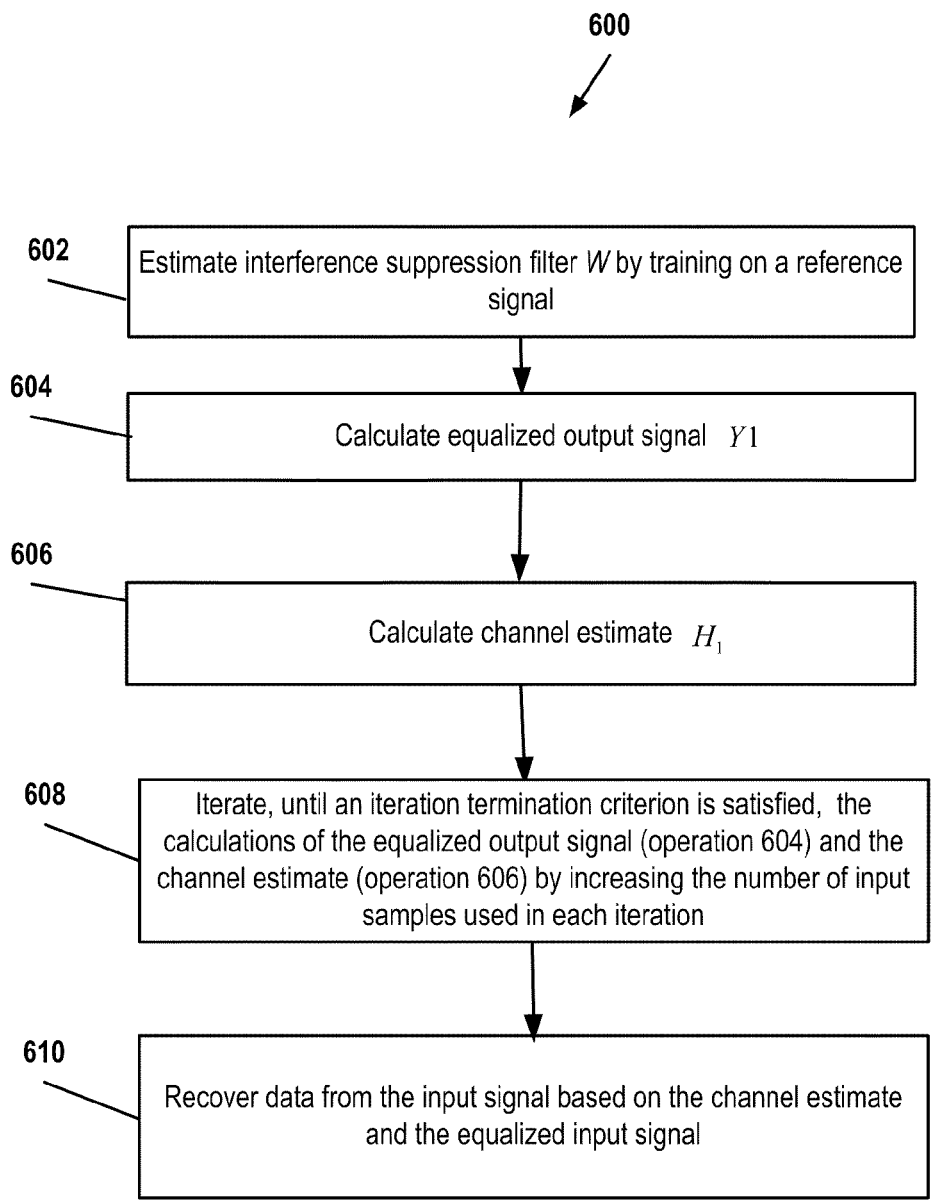
FIG. 6 is a flow chart of an exemplary multi-stage interference suppression process, in accordance with certain configurations of the present disclosure.

FIG. 6 is a flow chart of an exemplary multi-stage interference suppression (MSIS) process 600, in accordance with certain configurations of the present disclosure. The process 600 may produce demodulated data samples from an input signal. In certain configurations, the decoding process 600 may be implemented in the MSIS 300 depicted in FIGS. 3A and 3B. The decoding process 600 may comprise the operation 602 of estimating an interference suppression filter W by training on a reference signal. In certain configurations, the operation 602 may be performed as previously discussed with respect to the short equalizer section 302 (e.g., Equation 5). The decoding process 600 may further comprise the operation 604 of calculating an equalized output signal Y1. In certain configurations, the operation 604 may be performed as previously discussed with respect to the channel estimator section 304 (e.g., Equation 6). The decoding process 600 may further comprise the operation 606 of calculating a channel estimate $H_1$ (e.g., Equation 8). The decoding process 600 may further comprise the operation 608 iterating, until an iteration termination criterion is satisfied, the calculations of the equalized output signal (operation 604) and the channel estimate (operation 606) by increasing the number of input samples used in each iteration. The decoding process 600 may also include operation 610 wherein, upon termination of the iterative refinement process 608, data from the input signal may be recovered based on the channel estimate and the equalizes input signal at the termination of operation 608. In certain configurations, the iterative operation 608 may include the long equalizer 306 and the interference canceller 308, as previously described. The iterative operation 608 is further described in detail below.

Figure 7A:
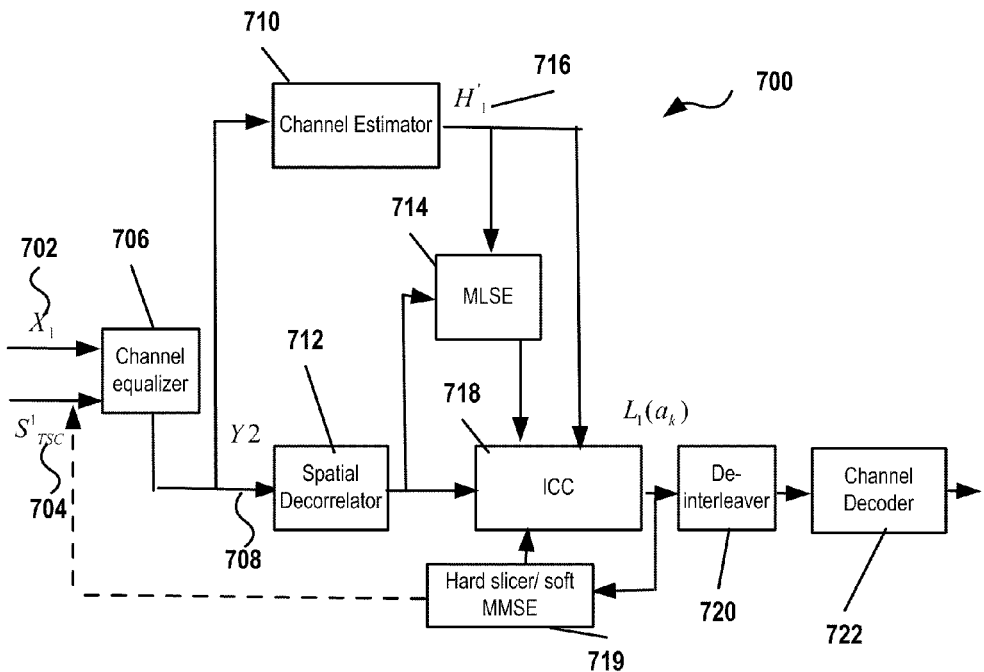
FIG. 7A is a block diagram illustrating a receiver in accordance with certain configurations of the present disclosure.

FIG. 7A is a block diagram illustrating a receiver 700 in accordance with certain configurations of the present application. In the illustrated configuration, symbol decision feedback may be used from symbol decisions made in the ICC section 718 to a channel equalizer section 706 to successively improve interference suppression. In certain configurations, the use of feedback to iteratively improve channel suppression may lend itself to an implementation in which a channel equalizer begins an iterative symbol detection process as a "short" equalizer and progressively becomes a "longer" channel equalizer in successive iterations. In other words, a channel equalizer section may operate as a short equalizer (on a smaller number of input samples) at the onset of the iterative process, and may operate as a long equalizer (on a higher number of input samples compared to the first iteration) in the final iterations.

As seen in FIG. 7A, samples of a received signal $X_1$ 702 and a set of known symbols $S^1_{TSC}$ 704 may be input to a channel equalizer section 706. In certain configurations, the received signal $X_1$ 702 may be identical to the received signal X 406, the set of known symbols $S^1_{TSC}$ 704 may be identical to $S_{TSC}$ 410 of FIG. 4 and the channel equalizer 706 may be identical to the short equalizer 302 of FIG. 3D. The channel equalizer section 706 may output a first equalized signal Y2 708 and a first estimate of the channel. In certain configurations the first equalized signal Y2 708 may be identical to Y1 408 of FIG. 4. A channel estimator section 710 may produce a second estimate of the channel $H'_1$ 716 and a first estimate of symbols. In certain configurations, the channel estimator section 710 may be identical to the long equalizer section 306 of FIG. 3D and the second estimate of the channel $H'_1$ 716 may be identical to $H_1$ 510 of FIG. 5. The MLSE section 714 may receive the first equalized signal Y2 708, after it has been re-arranged in a spatially decorrelated form in a spatial decorrelator section 712, to produce a second equalized signal input to the interference canceller section 718. In certain configurations, the MLSE section 714 may be identical to the MLSE section 506 of FIG. 5, and the first equalized signal Y2 708 may be identical to Y1 408 of FIGS. 4 and 5. The operational principles of a spatial decorrelator section 712 are well-known in the art.

Still referring to FIG. 7A, the interference canceller section 718 may use the first estimate of symbols and a channel estimate from the channel estimator section 710 to generate a second estimate of symbols and a log-likelihood value associated with the second symbol estimates. In certain configurations, the interference canceller section 718 may be identical to the interference canceller section 308 of FIG. 3D. The channel estimate may be iteratively refined using a minimum mean square errors (MMSE) symbol estimation section 719 that uses a hard slicer and a soft MMSE symbol decision algorithm to produce refined estimates of symbols that are further used by the channel equalizer section 706 in the next iteration. An iteration termination criterion such as the mean square error improvement from one iteration to the next, or the expiration of a timing budget to calculate the symbol estimates, may be used in terminating the iterative estimation process. Previously referenced U.S. patent application Ser. No. 12/553,855 describes certain iterative techniques to refine symbol estimates. A de-interleaver section 720 may de-interleave symbols from the second estimate of symbols. In certain configurations, the de-interleaver section 720 may be identical to the de-interleaver section 310 of FIG. 3D. A channel decoder section 722 may use the de-interleaved symbols to produce data output. In certain configurations, the channel decoder section 722 may be identical to the channel decoder section 312 of FIG. 3D.

Figure 7B:
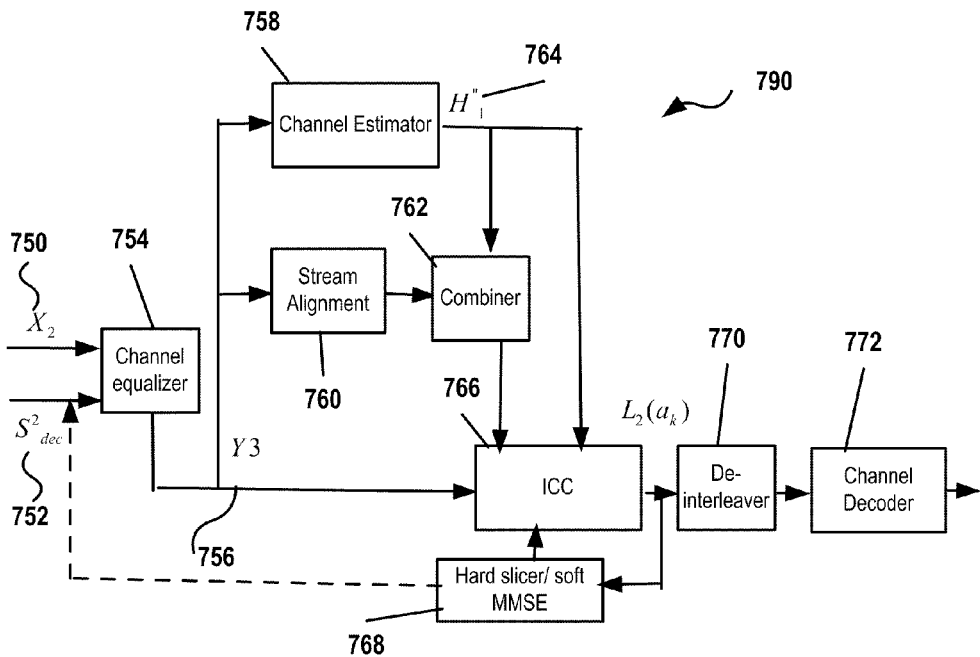
FIG. 7B is a block diagram illustrating a receiver in accordance with certain other configurations of the present disclosure.

FIG. 7B is a block diagram illustrating a receiver 790 in accordance with certain other configurations of the present application. In the illustrated configuration, symbol decision feedback may be used from a symbol decision section to a channel equalizer section to successively improve interference suppression. In certain configuration, the use of feedback to iteratively improve channel suppression may lend itself to an implementation in which a channel equalizer begins an iterative symbol detection process as a "short" equalizer and progressively becomes a "longer" channel equalizer in successive iterations. In other words, a channel equalizer section may operate as a short equalizer (on a smaller number of input samples) at the onset of the iterative process, and may operate as a long equalizer (on a higher number of input samples compared to the first iteration) in the final iterations.

As seen in FIG. 7B, samples of a received signal $X_2$ 750 and a set of symbols $S^2_{dec}$ 752 may be input to a channel equalizer section 754. In certain configurations, in the first iteration, the set of symbols $S_{dec}$ 752 may be equal to the set of symbols $S^1_{TSC}$ 704 of FIG. 7A. The channel equalizer section 754 may output a first equalized signal Y3 756 and a first estimate of the channel. In certain configurations, the channel equalizer section 754 may be identical to the short equalizer section 302 of FIG. 3D and the first equalized signal Y3 756 may be identical to Y1 408 of FIGS. 4 and 5. A channel estimator section 758 may produce a second estimate of the channel $H''_1$ 764 and a first estimate of symbols. In certain configurations, the channel estimator section 758 may be identical to the long equalizer section 306 of FIG. 3D and the second estimate of the channel $H''_1$ 764 may be identical to $H_1$ 510 of FIG. 5. A combiner section 762 may receive the first equalized signal Y3 756, aligned for ease of calculations in a stream alignment section 760, to produce a second equalized signal input to the interference canceller section 766.

Still referring to FIG. 7B, the stream alignment section 760 may operate to implement the mathematical operations described with respect to equation (9) above. The interference canceller section 766 may use the first estimate of symbols and the second estimate of the channel to generate a second estimate of symbols and a log-likelihood value associated with the second symbol estimates. In certain configurations, the combiner section 762 may be identical to the combiner section 504 of FIG. 5 and the interference canceller section 766 may be identical to the interference canceller section 308 of FIG. 3D. The channel estimate may be iteratively refined using a minimum mean square errors (MMSE) symbol estimation section 768 that uses a hard slicer and a soft MMSE symbol decision algorithm to produce refined estimates of symbols that are further used by the channel equalizer section 754 in the next iteration. An iteration termination criterion such as the mean square error improvement from one iteration to the next, or the expiration of a timing budget to calculate symbol estimate, may be used in terminating the iterative estimation process. Previously referenced U.S. patent application Ser. No. 12/553,855 describes certain iterative techniques to refine symbol estimates. A de-interleaver section 770 may de-interleave symbols from the second estimate of symbols. In certain configurations, the de-interleaver section 770 may be identical to the de-interleaver section 310 of FIG. 3D. A channel decoder section 772 may use the de-interleaved symbols to produce data output. In certain configurations, the channel decoder section 772 may be identical to the channel decoder section 312 of FIG. 3D.

With reference again to the configuration depicted in FIG. 3B, data recovery may be performed as follows. Initially, an entire first iteration of MSIS may be performed on input signal 350. In the first iteration of MSIS section 305, the calculations shown in Equations (5), (6) and (8) above may be performed to produce an interference suppression filter, an equalized signal and a channel estimate, respectively. In certain configurations, such as when the input signal 350 is a GSM data portion 207, the length P may be equal to 26.

After the first iteration as above, the received signal may be divided into a plurality of symbol blocks (e.g., block of symbols 222, 224 and 226) as previously described. The subsequent iterations of the MSIS may then be iterated individually on the blocks of symbols 222, 224, 226 in sections 301. The operation of the subsequent iterations, previously called "full-adaptive" subsequent iterations of the MSIS, may be performed as previously described with respect to method 600. During each iteration, the following quantities may be estimated $$W_d = [S_d][X_d]^T \{[X_d][X_d]^T\}^{-1}, (v+1) \times M(L+1) \quad (11)$$

$$Y1_d = [W_d][X_d], (v+1) \times (P_d - v) \quad (12)$$

$$[\hat{H}_d]_1 = [Y1_d][S_d]^H [S_d S_d^H]^{-1}. \quad (13)$$

In the equations above, $W_d$ may represent the interference suppression filter, $Y1_d$ may represent the equalized signal and $H_d$ may represent a channel estimate based on the $d^{th}$ block of symbols. The length $P_d$ may be chosen to satisfy $P_d > M(L+1)+v$, for d=1, . . . D. In general, the blocks of symbols may not be disjoint, such as, depicted in FIG. 2D.

It will be appreciate that each block of symbols 222, 224 and 226 includes fewer samples than the data portion 207 and corresponds to a shorter period of time. In a non-stationary environment, recovering data by performing channel estimation/interference cancellation over a shorter duration input may produce more accurate results (e.g., lower bit error rate) because variations in the channel characteristics and the carrier frequency may be lower over the smaller time period.

With reference again to the configuration depicted in FIG. 3C, in the depicted "reduced-complexity adaptive" configuration, the input signal 350 may be processed in the first iteration of MSIS section 305 as previously described. In the reduced complexity adaptive subsequent iterations of MSIS section 303, the interference suppression filter W, calculated in the first iteration of MSIS 305, may be used. Such an arrangement may avoid the need to compute the interference suppression filter W in the subsequent iterations of MSIS.

While the full-adaptive and the reduced complexity adaptive subsequent iterations of MSIS are described with respect to block of symbols 222, 224 and 226, it will be appreciated that any other partitioning of symbols, such as blocks of symbols 232, 234 depicted in FIG. 2D may be used.

$$W = [S][X]^T \{[X][X]^T\}^{-1}, (v+1) \times M(L+1) \quad (14)$$

$$Y1 = [W][X], (v+1) \times (P-v) \quad (15)$$

$$[\hat{H}_d]_1 = [Y1_d][S_d]^H [S_d S_d^H]^{-1}. \quad (16)$$

In Eq. (16) above, $[Y1_d]$ represents a $(v+1) \times (P_d - v)$ matrix, representing $P_d$ columns of the matrix [Y1] in Eq. (15) above. In the reduced complexity adaptive subsequent iterations of MSIS, channels estimates calculated in subsequent iterations may use the equalized signal calculated during the first (the initial) iteration.

Figure 8A:
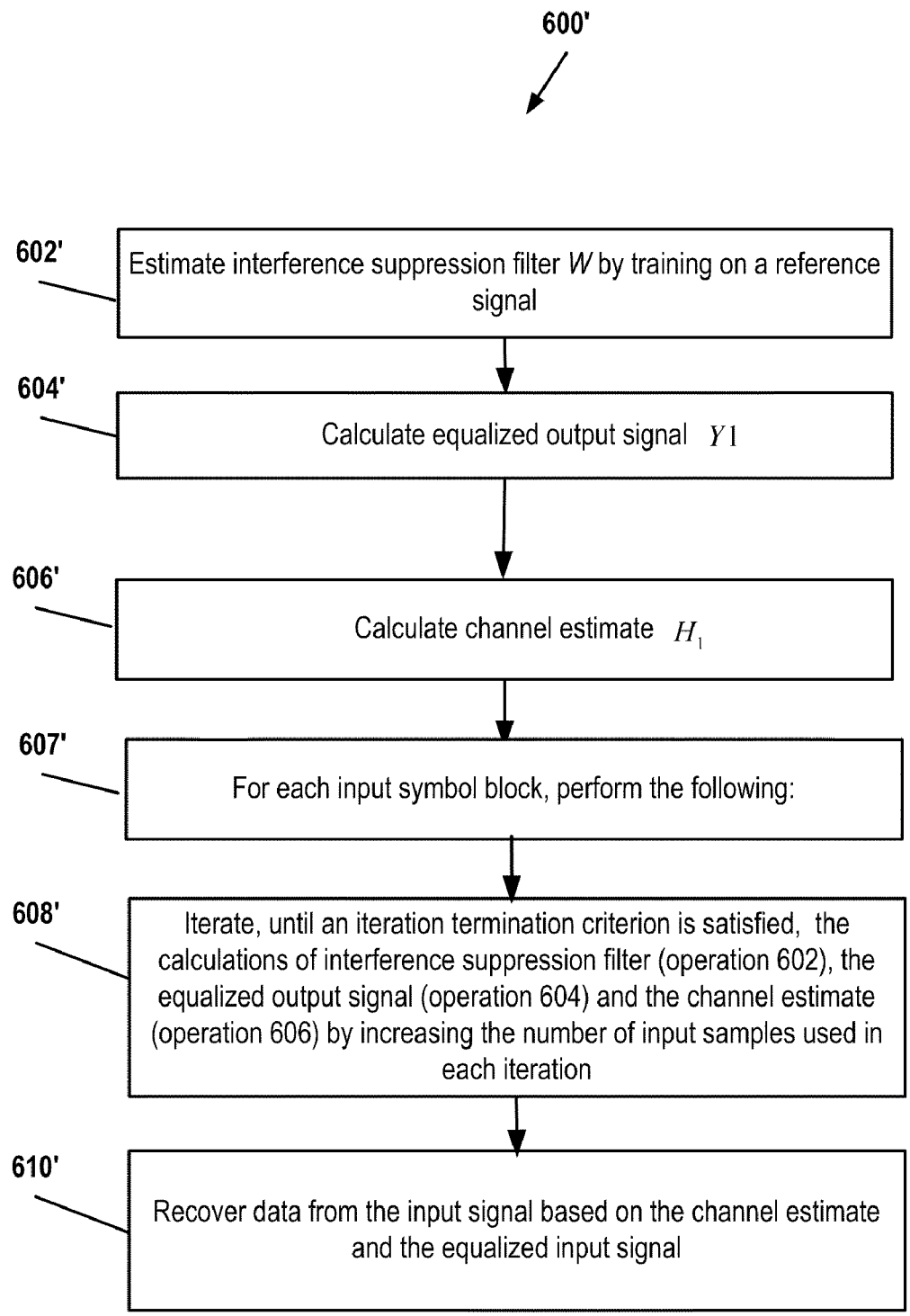
FIG. 8A is a flow chart of an exemplary multi-stage interference suppression process, in accordance with certain configurations of the present disclosure.

FIG. 8A is a flow chart of an exemplary data recovery process 600', in accordance with certain configurations of the present disclosure. In certain configurations, the operations 602', 604', 606', 608' and 610' may be substantially identical to the previously described operations 602, 604, 606, 608 and 610 respectively. In addition, in operation 607', input symbols may be partitioned into D partitions, such as described with respect to FIGS. 2C and 2D, and the operations 608' and 610' may be performed on each of the block of symbols separately.

Figure 8B:
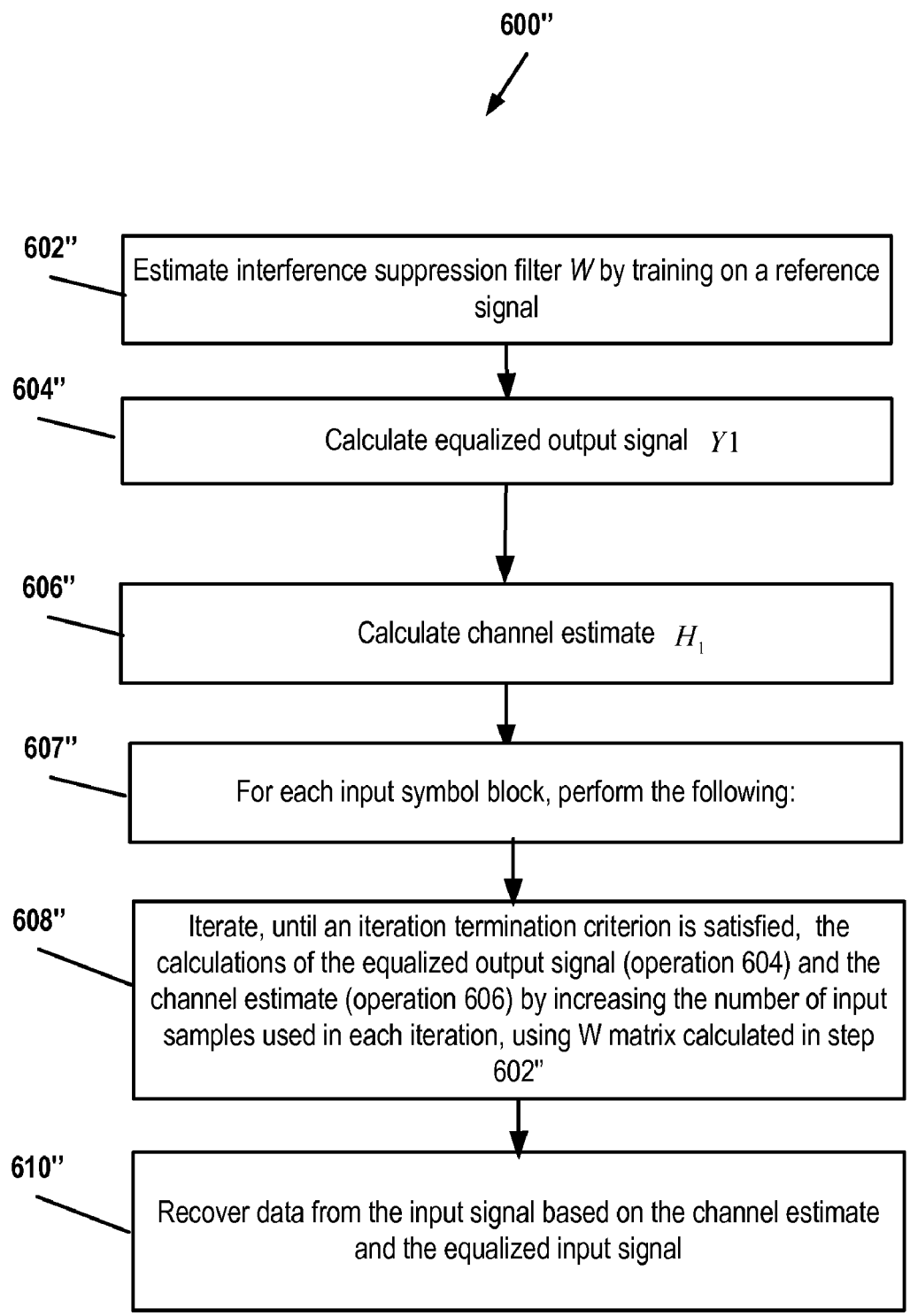
FIG. 8B is a flow chart of an exemplary multi-stage interference suppression process, in accordance with certain configurations of the present disclosure.

FIG. 8B is a flow chart of an exemplary data recovery process 600", in accordance with certain configurations of the present disclosure. In certain configurations, the operations 602", 604", 606", 608" and 610" may be substantially identical to the previously described operations 602, 604, 606, 608 and 610 respectively. In addition, in operation 607", input symbols may be partitioned into D partitions, such as described with respect to FIGS. 2C and 2D, and the operations 608" and 610" may be performed on each of the block of symbols separately. The operation 608" may be substantially similar to the operation 608, except no equalized signal output Y1 may be estimated and the columns of the Y1 matrix may be used instead, as described with respect to Eq. (16) above. It will be appreciated that the computational complexity of the process 600" can be significantly lower than that of process 600' because of the reuse of the previously calculated interference suppression filter and equalized signals. It is well known that estimation of an interference suppression filter typically is a computationally expensive process. By sharing results of interference suppression filter from the first iteration 305, computational total number of calculations can therefore be significantly reduced. As an example, up to 70% of the computational resources required by the MSIS process 600 may be expended in the calculation of the interference suppression filter. Therefore, sharing the results between different MSIS sections can lead to significant reduction in the number of calculations performed to recover data.

Figure 8C:
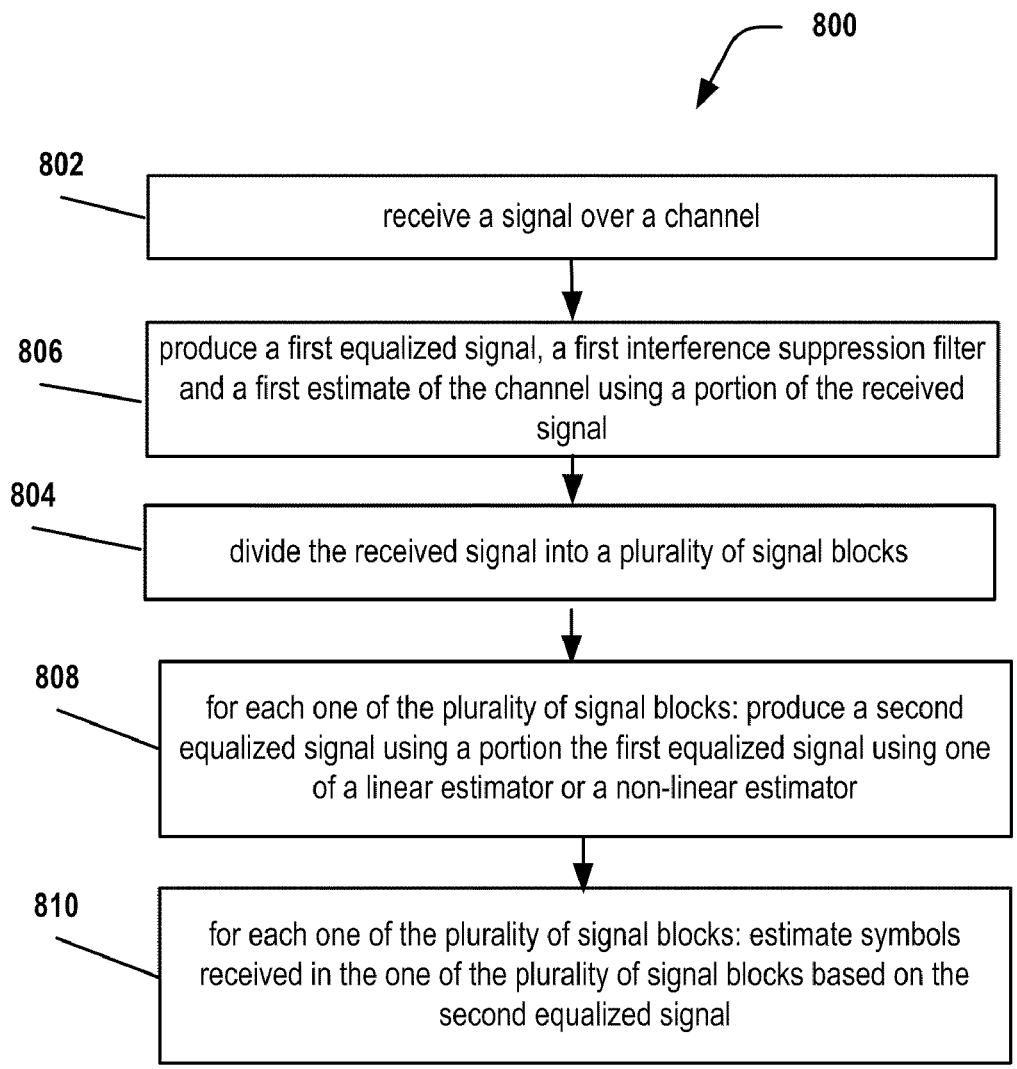
FIG. 8C is a flow chart of an exemplary data reception process, in accordance with certain configurations of the present disclosure.

FIG. 8C is a flow chart of an exemplary signal reception process 800, in accordance with certain configurations of the present disclosure. The process 800 may comprise operation 802 of receiving a signal over a channel. In certain configurations, the received signal may correspond to the data portion 207. The process 800 may further include operation 806 of producing a first equalized signal, a first interference suppression filter and a first estimate of the channel using a portion of the received signal. In certain configurations, the portion of the received signal may include the midamble portion 208, the first equalized signal may be produced by performing operation 604' of calculating an equalized output signal (e.g., as shown in Equation 6) on the midamble portion 208 and the first estimate of channel $H_1$ may be produced by performing the operation 606' of performing channel estimation on the results of operation 604'. In certain configurations the operation 806 may correspond to the first iteration of MSIS 305, described above with respect to FIGS. 3B and 3C. The process 800 may further comprise operation 804 of dividing the received signal into a plurality of signal blocks. In certain configuration, operation 804 may divide the received signal into block 222, 224, 226 depicted in FIG. 2C. In certain configuration, operation 804 may divide the received signal into block 232 and block 234 depicted in FIG. 2D.

Still referring to FIG. 8C, the process 800 may further include operation 808 of, for each one of the plurality of signal blocks, producing a second equalized signal using a portion of the first equalized signal using one of a linear estimator or a non-linear estimator. In certain configurations, operation 808 may be substantially identical to the long equalization and interference cancellation operations described with respect to long equalizer sections 306 and interference canceller section 308. In certain configurations, the operation 808 may be performed iteratively, as described with respect to operation 608". The process 800 may further include, for each one of the plurality of signal blocks, operation 810 of estimating symbols received in one of the plurality of signal blocks based on the second equalized signal. In certain configurations, the one signal block may be block 232 or 234 depicted in FIG. 2D.

Still referring to FIG. 8C, the process 800 may further include the operation 810 of estimating symbols received in the one of the plurality of signal blocks based on the second equalized signal. In certain configurations, the operation 810 may be substantially identical to the previously described operation 610. In certain configurations, the operation 810 may be performed on each block of symbols of a received data portion 207, and the entire data received in the data portion 207 may thus be recovered.

It will be appreciated that certain configurations of the present disclosure may enable recovery of data from received data portion 207 by dividing the received signal into multiple symbol blocks of shorter duration and performing interference cancellation/channel estimation on the shorter duration symbol blocks. When a channel is non-stationary, such as when the transmitter and the receiver are moving with respect to each other, such processing of signals by dividing into shorter duration portions may result in overall better interference cancellation and channel estimation. As a result, the recovered data may have a lower bit error rate for the same carrier to interference ratio, compared to a scheme where the entire received data portion 207 is equalized and a channel is estimated based on the entire received data portion 207. In another advantageous aspect, configurations of the present application may also be useful in mitigating frequency accuracy error between a transmitter's carrier frequency and a receiver's estimate of the carrier frequency that may result due to component inaccuracies and/or Doppler shift between the transmitter and receiver. Furthermore, sharing the results between date recovery sections for individual smaller time duration blocks may help reduce computational complexity.

Figure 9:
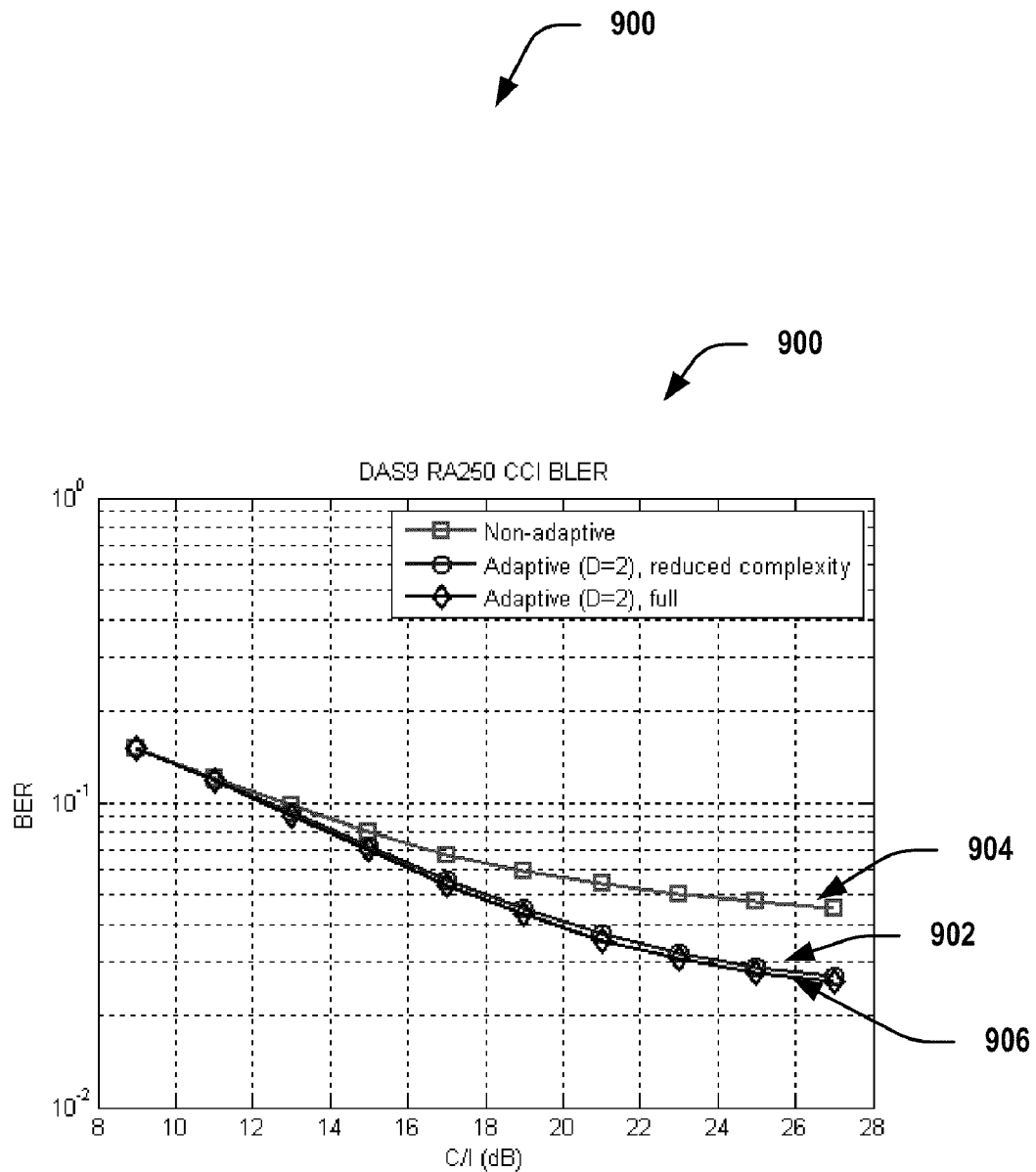
FIG. 9 is a chart illustrating bit error rate performance improvements achievable utilizing certain aspects of the subject technology, in accordance with certain configurations of the present disclosure.

FIG. 9 is a chart 900 illustrating exemplary performance achievable in accordance with certain configurations of the subject technology. Chart 900 depicts the symbol error rate over a range of carrier energy to interference energy ratios (C/I) for exemplary receiver systems operating on a non-stationary GERAN-EV communication channel DAS-9, RA250 profile, using 16-QAM modulation in the presence of CCI. As can be seen in chart 900, the curve 902 represents performance using data reception technique that utilizes multiple MSIS sections operating on multiple symbol portions (identified as "Adaptive, full") and is seen to improve by over 2 dB compared to performance using a non-adaptive MSIS technique depicted by curve 904. Curve 906 represents performance using an adaptive, reduced complexity technique utilizing multiple MSIS sections sharing intermediate results. As can be seen, the previously discussed significant reduction in computational complexity, comes with only a small (typically less than 0.2 dB) reduction in performance over curve 902.

Figure 10:
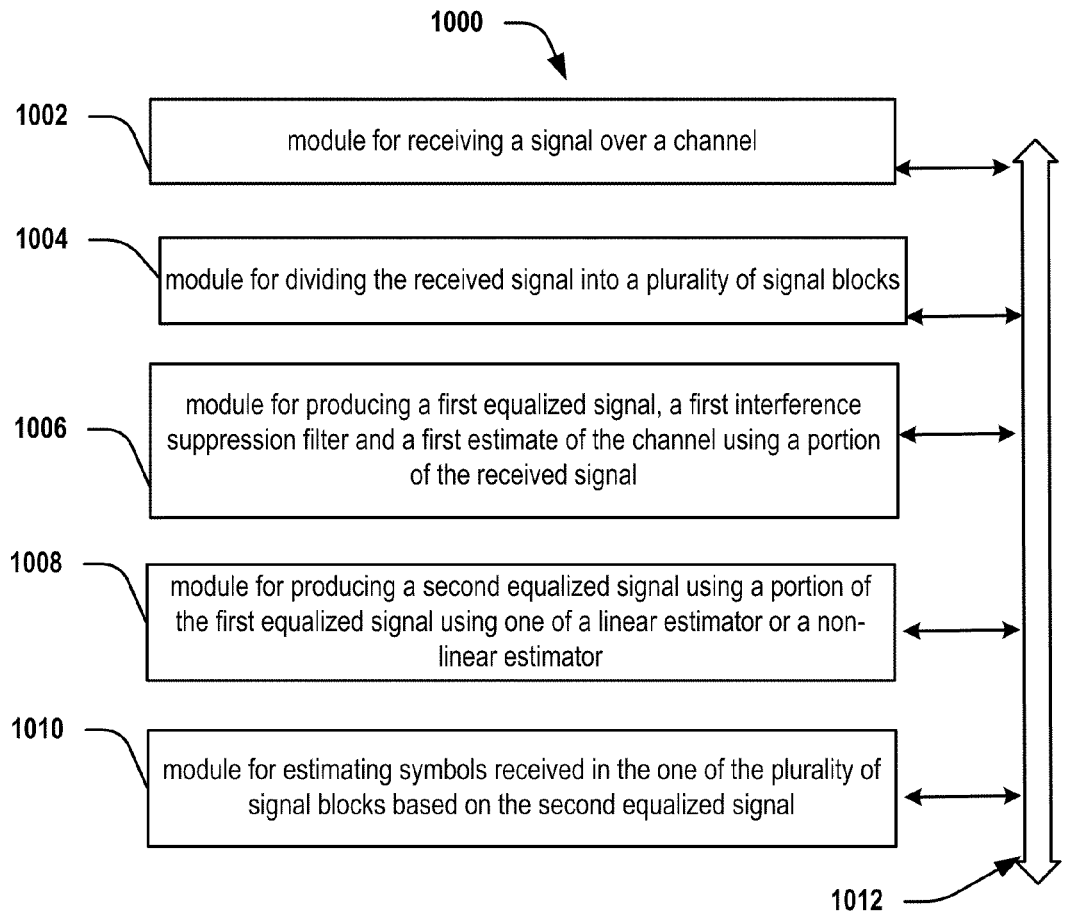
FIG. 10 is a block diagram illustrating an apparatus with which certain aspects of the subject technology may be implemented in accordance with certain configurations of the present disclosure.

FIG. 10 is a block diagram that illustrates exemplary receiver apparatus 1000 in accordance with certain configurations of the present disclosure. The receiver apparatus 1000 comprises module 1002 for receiving a signal over a channel, module 1004 for dividing the received signal into a plurality of signal blocks, module 1006 for producing a first equalized signal, a first interference suppression filter and a first estimate of the channel using a portion of the received signal, module 1008 for producing a second equalized signal using a portion of the first equalized signal using one of a linear estimator or a non-linear estimator, module 1010 for estimating symbols received in the one of the plurality of signal blocks based on the second equalized signal, all in communication via communication module 1012.

Figure 11:
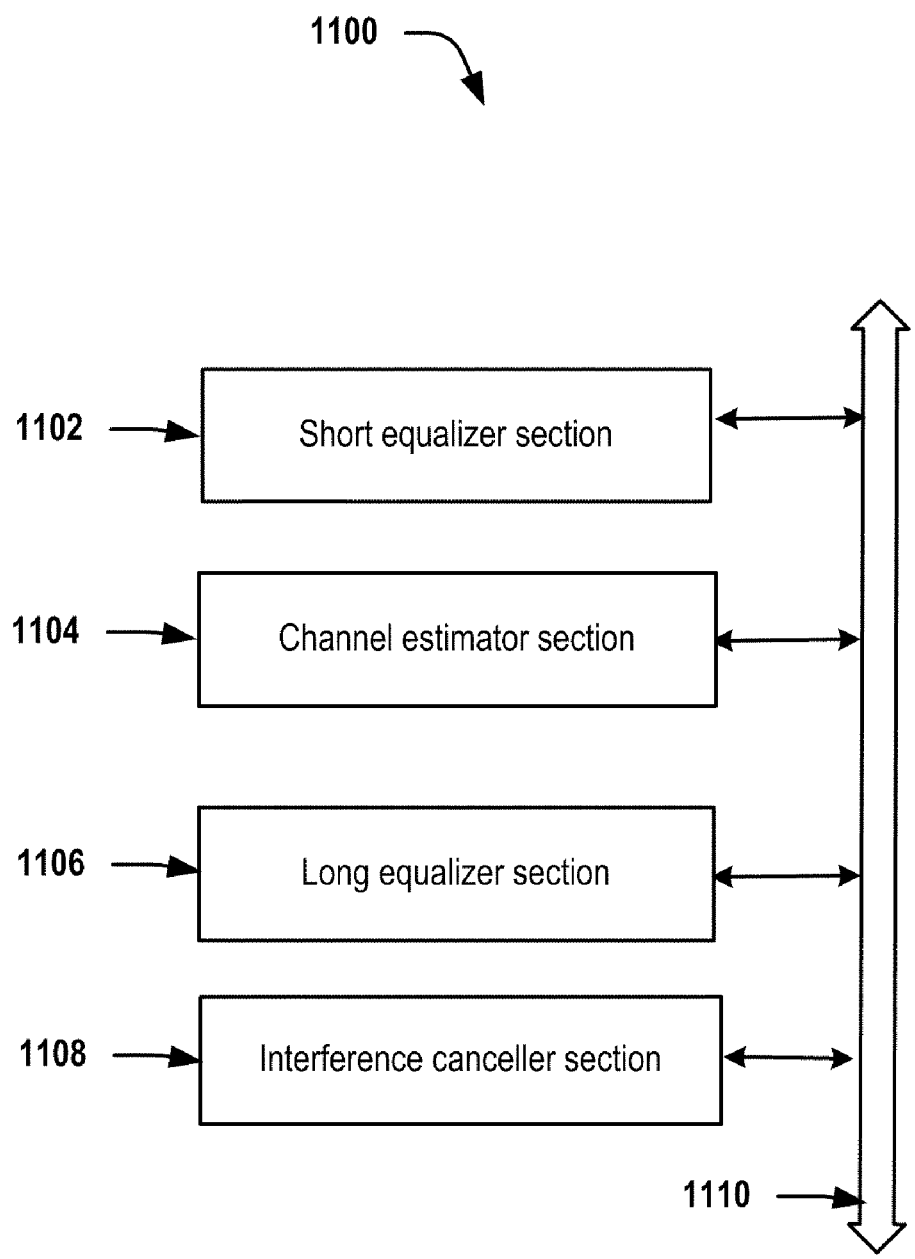
FIG. 11 is a block diagram illustrating an apparatus with which certain aspects of the subject technology may be implemented in accordance with certain configurations of the present disclosure.

FIG. 11 is a block diagram that illustrates exemplary receiver system 1100 in accordance with certain configurations of the subject technology. The receiver system 1100 comprises a short equalizer section 1102 configured to produce a first equalized signal and a first estimate of a channel by operating on a first portion of a received signal received over a channel, a channel estimator section 1104 configured to produce a second equalized signal using the first equalized signal and one of a linear estimator and a non-linear estimator, a long equalizer section 1106 configured to estimate a first estimate of symbols in the received signal and a second estimate of channel from a second portion of the received signal and an interference canceller section 1108 configured to generate a second estimate of symbols in the received signal, based on the second estimate of the channel. As depicted in FIG. 11, the modules 1102, 1104, 1106 and 1108 are in communication via a communication module 1110.

Figure 12:
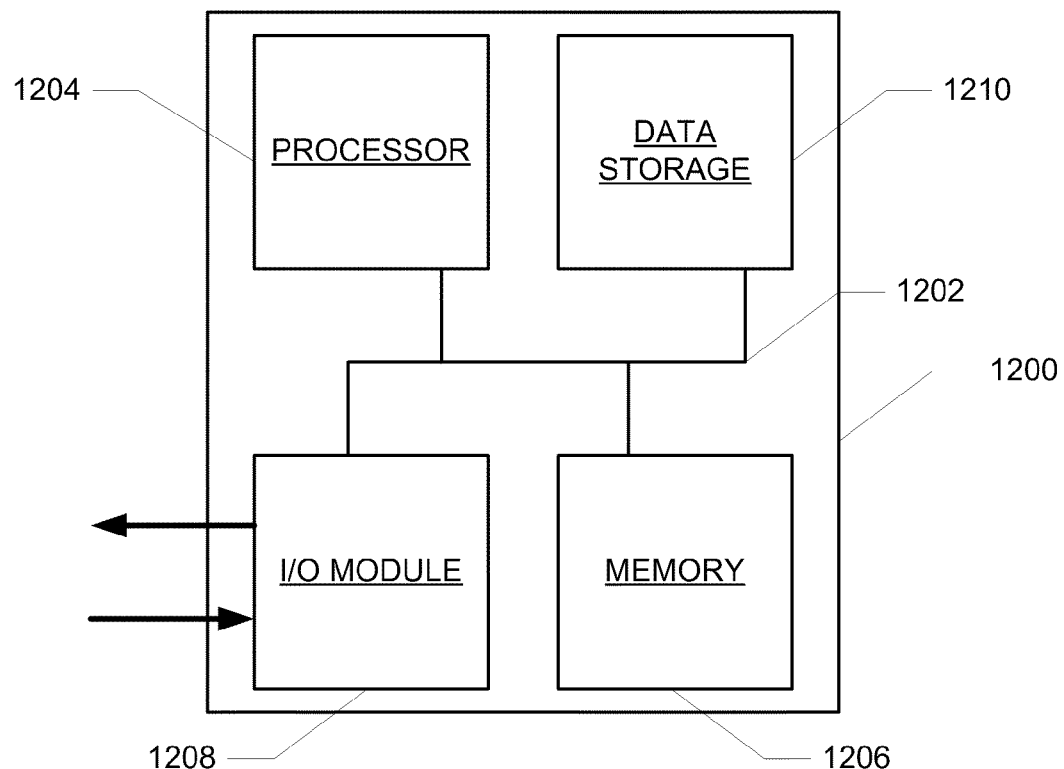
FIG. 12 is a block diagram illustrating a computer system with which certain aspects of the subject technology may be implemented in accordance with certain configurations of the present disclosure.

FIG. 12 is a block diagram that illustrates a computer system 1200 upon which an aspect of the subject technology of the present application may be implemented. Computer system 1200 includes a bus 1202 or other communication mechanism for communicating information, and a processor 1204 coupled with bus 1202 for processing information. Computer system 1200 also includes a memory 1206, such as a random access memory ("RAM") or other dynamic storage device, coupled to bus 1202 for storing information and instructions to be executed by processor 1204. Memory 1206 can also be used for storing temporary variable or other intermediate information during execution of instructions to be executed by processor 1204. Computer system 1200 further includes a data storage device 1210, such as a magnetic disk or optical disk, coupled to bus 1202 for storing information and instructions.

Computer system 1200 may be coupled via I/O module 1208 to a display device (not illustrated), such as a cathode ray tube ("CRT") or liquid crystal display ("LCD") for displaying information to a computer user. An input device, such as, for example, a keyboard or a mouse may also be coupled to computer system 1200 via I/O module 1208 for communicating information and command selections to processor 1204.

According to one aspect, interference suppression may be performed by a computer system 1200 in response to processor 1204 executing one or more sequences of one or more instructions contained in memory 1206. Such instructions may be read into memory 1206 from another machine-readable medium, such as data storage device 1210. Execution of the sequences of instructions contained in main memory 1206 causes processor 1204 to perform the process steps described herein. One or more processors in a multi-processing arrangement may also be employed to execute the sequences of instructions contained in memory 1206. In alternative aspects, hard-wired circuitry may be used in place of or in combination with software instructions to implement various aspects. Thus, aspects are not limited to any specific combination of hardware circuitry and software.

The term "machine-readable medium" as used herein refers to any medium that participates in providing instructions to processor 1204 for execution. Such a medium may take many forms, including, but not limited to, non-volatile media, volatile media, and transmission media. Non-volatile media include, for example, optical or magnetic disks, such as data storage device 1210. Volatile media include dynamic memory, such as memory 1206. Transmission media include coaxial cables, copper wire, and fiber optics, including the wires that comprise bus 1202. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative sections, blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "operation for."

What is claimed is:

1. A signal reception method comprising:
receiving a signal over a channel;
producing a first equalized signal, a first interference suppression filter and a first estimate of the channel using a portion of the received signal;
dividing the received signal into a plurality of signal blocks; and
for each one of the plurality of signal blocks:
producing a second equalized signal using a portion of the first equalized signal and one of a linear estimator or a non-linear estimator; and
estimating symbols received in the one of the plurality of signal blocks based on the second equalized signal.

2. The signal reception method of claim 1, wherein the step of producing the second equalized signal uses one of the linear estimator or the non-linear estimator responsive to a modulation type of the received signal.

3. The signal reception method of claim 2, wherein the step of producing the second equalized signal uses the linear estimator if the modulation type comprises more than one bit per symbol, and otherwise uses the non-linear estimator.

4. The signal reception method of claim 1, wherein the portion of the received signal comprises a symbol received prior to receiving any symbol of at least one of the plurality of signal blocks.

5. The signal reception method of claim 1, further comprising:
de-interleaving the estimated symbols to produce a symbol sequence, and
generating received data from the symbol sequence.

6. The signal reception method of claim 1, wherein the portion of the received signal comprises a known signal comprising a midamble.

7. The signal reception method of claim 1, further comprising:
for each one of the plurality of signal blocks:
calculating a second estimate of the channel using the portion of the first equalized signal.

8. The signal reception method of claim 1, wherein one of the second equalized signals comprises a midamble portion and a data bits portion.

9. The signal reception method of claim 1, further comprising:
extracting a timing information from the received signal; and
generating an estimate of a carrier frequency from the received signal.

10. The signal reception method of claim 9, wherein the operation of producing the first equalized signal further comprises using the estimate of the carrier frequency and the timing information to minimize an estimation error incurred in producing the first equalized signal and the first estimate of the channel.

11. The signal reception method of claim 1, wherein the operation of producing the first equalized signal further comprises producing the first equalized signal using a blind estimation algorithm.

12. The signal reception method of claim 1, wherein the operation of producing the second equalized signal further comprises producing a second interference suppression filter using the one of the plurality of signal blocks.

13. The signal reception method of claim 1, further comprising:
iteratively refining the estimated symbols and the second equalized signal from each other until an iteration termination criterion is met.

14. A signal receiver comprising:
a processor; and
a memory;
wherein the processor is configured to execute of instructions stored in the memory to:
receive a signal over a channel;
produce a first equalized signal, an interference suppression filter and a first estimate of the channel using a portion the received signal;
divide the received signal into a plurality of signal blocks; and
for each one of the plurality of signal blocks:
produce a second equalized signal using a portion of the first equalized signal and one of a linear estimator or a non-linear estimator; and
estimate symbols received in the one of the plurality of signal blocks based on the second equalized signal.

15. The signal receiver of claim 14, wherein the processor is further configured to execute instructions stored in the memory to use one of the linear estimator or the non-linear estimator responsive to a modulation type of the received signal.

16. The signal receiver of claim 15, wherein the processor is further configured to execute instructions stored in the memory to use the linear estimator if the modulation type comprises more than one bit per symbol, and otherwise use the non-linear estimator.

17. The signal receiver of claim 14, wherein the portion of the received signal comprises a symbol received prior to receiving any symbol of the at least one of the plurality of signal blocks.

18. The signal receiver of claim 14, wherein the processor is further configured to execute instructions stored in the memory to:
de-interleave the estimated symbols to produce a symbol sequence; and
generate received data from the symbol sequence.

19. The signal receiver of claim 14, wherein the portion of the received signal comprises a known signal comprising a midamble.

20. The signal receiver of claim 14, wherein the processor is further configured to execute instructions stored in the memory to:
calculate a second estimate of the channel using the portion of the first equalized signal.

21. The signal receiver of claim 14, wherein one of the second equalized signals comprises a midamble portion and a data bits portion.

22. The signal receiver of claim 14, wherein the processor is further configured to execute instructions stored in the memory to:
extract a timing information from the received signal; and
generate an estimate of a carrier frequency from the received signal.

23. The signal receiver of claim 22, wherein the processor is further configured to execute instructions stored in the memory to:
use the estimate of the carrier frequency and the timing information to minimize an estimation error incurred in producing the first equalized signal and the first estimate of the channel.

24. The signal receiver of claim 14, wherein the processor is further configured to execute instructions stored in the memory to:
produce the first equalized signal using a blind estimation algorithm.

25. The signal receiver of claim 14, wherein the processor is further configured to execute instructions stored in the memory to:
iteratively refine the estimated symbols and the second equalized signal from each other until an iteration termination criterion is met.

26. A non-transitory machine-readable medium encoded with instructions for receiving a signal at a receiver, the instructions comprising code for:
receiving a signal over a channel;
producing a first equalized signal, a first interference suppression filter and a first estimate of the channel using a portion of the received signal;
dividing the received signal into a plurality of signal blocks; and
for each one of the plurality of signal blocks:
producing a second equalized signal using a portion of the first equalized signal and one of a linear estimator or a non-linear estimator; and
estimating symbols received in the one of the plurality of signal blocks based on the second equalized signal.

27. The machine-readable medium of claim 26, wherein the code for producing the second equalized signal comprises code for using one of the linear estimator or the non-linear estimator responsive to a modulation type of the received signal.

28. The machine-readable medium of claim 27, wherein the code for producing the second equalized signal comprises code for selectively using the linear estimator if the modulation type comprises more than one bit per symbol, and otherwise uses the non-linear estimator.

29. The machine-readable medium of claim 26, wherein the portion of the received signal comprises a symbol received prior to receiving any symbol of at least one of the plurality of signal blocks.

30. The machine-readable medium method of claim 26, further comprising code for:
de-interleaving the estimated symbols to produce a symbol sequence, and
generating received data from the symbol sequence.

31. The machine-readable medium of claim 26, wherein the portion of the received signal comprises a known signal comprising a midamble.

32. The machine-readable medium of claim 26, further comprising code for:
calculating, for each one of the plurality of signal blocks, a second estimate of the channel using the portion of the first equalized signal.

33. The machine-readable medium of claim 26, wherein one of the second equalized signals comprises a midamble portion and a data bits portion.

34. The machine-readable medium of claim 26, further comprising code for:
extracting a timing information from the received signal; and
generating an estimate of a carrier frequency from the received signal.

35. The machine-readable medium of claim 34, wherein the code for producing the first equalized signal further comprises code for using the estimate of the carrier frequency and the timing information to minimize an estimation error incurred in producing the first equalized signal and the first estimate of the channel.

36. The machine-readable medium of claim 26, wherein the code for of producing the first equalized signal further comprises code for producing the first equalized signal using a blind estimation algorithm.

37. The machine-readable medium of claim 26, wherein the code for producing the second equalized signal further comprises code for producing a second interference suppression filter using the at least one of the plurality of signal blocks.

38. The machine-readable medium of claim 26, further comprising:
code for iteratively refining the estimated symbols and the second equalized signal from each other until an iteration termination criterion is met.

39. A signal reception apparatus comprising:
means for receiving a signal over a channel;
means for producing a first equalized signal, an interference suppression filter and a first estimate of the channel using a portion of the received signal;
means for dividing the received signal into a plurality of signal blocks; and for each one of the plurality of signal blocks:
  means for producing a second equalized signal using a portion of the first equalized signal and one of a linear estimator or a non-linear estimator; and
  means for estimating symbols received in the one of the plurality of signal blocks based on the second equalized signal.

40. The signal reception apparatus of claim 39, wherein the means for producing the second equalized signal uses one of the linear estimator or the non-linear estimator responsive to a modulation type of the received signal.

41. The signal reception apparatus of claim 40, wherein the means for producing the second equalized signal uses the linear estimator if the modulation type comprises more than one bit per symbol, and otherwise uses the non-linear estimator.

42. The signal reception apparatus of claim 39, wherein the portion of the received signal a symbol received prior to receiving any symbol of at least one of the second one of the plurality of signal blocks.

43. The signal reception apparatus of claim 39, further comprising:
  means for de-interleaving the estimated symbols to produce a symbol sequence, and
  means for generating received data from the symbol sequence.

44. The signal reception apparatus of claim 39, wherein the portion of the received signal comprises a known signal comprising a midamble.

45. The signal reception apparatus of claim 39, further comprising:
  means for calculating, for each one of the plurality of signal blocks, a second estimate of the channel using the portion of the first equalized signal.

46. The signal reception apparatus of claim 39, wherein one of the second equalized signals comprises a midamble portion and a data bits portion.

47. The signal reception apparatus of claim 39, further comprising:
  means for extracting a timing information from the received signal; and
  means for generating an estimate of a carrier frequency from the received signal.

48. The signal reception apparatus of claim 47, wherein the means for producing the first equalized signal further comprises means for using the estimate of the carrier frequency and the timing information to minimize an estimation error incurred in producing the first equalized signal and the first estimate of the channel.

49. The signal reception apparatus of claim 39, wherein the means for producing the first equalized signal further comprises means for producing the first equalized signal using a blind estimation algorithm.

50. The signal reception apparatus of claim 39, further comprising:
  means for iteratively refining the estimated symbols and the second equalized signal from each other until an iteration termination criterion is met.

* * * * *